United States Patent
Alameh et al.

(10) Patent No.: US 11,790,872 B2
(45) Date of Patent: *Oct. 17, 2023

(54) METHODS AND SYSTEMS FOR ALTERING VIRTUAL BUTTON ARRANGEMENTS PRESENTED ON ONE OR MORE DISPLAYS OF AN ELECTRONIC DEVICE

(71) Applicant: Motorola Mobility LLC, Chicago, IL (US)

(72) Inventors: Rachid Alameh, Crystal Lake, IL (US); John Gorsica, Round Lake, IL (US); Michael Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,340

(22) Filed: Feb. 8, 2023

(65) Prior Publication Data

US 2023/0186873 A1    Jun. 15, 2023

Related U.S. Application Data

(63) Continuation of application No. 17/393,764, filed on Aug. 4, 2021, now Pat. No. 11,605,365, which is a
(Continued)

(51) Int. Cl.
*G09G 5/38* (2006.01)

(52) U.S. Cl.
CPC .......... *G09G 5/38* (2013.01); *G09G 2354/00* (2013.01); *G09G 2380/02* (2013.01)

(58) Field of Classification Search
CPC ........ G09G 5/38; G09G 5/363; G06T 11/001; G06T 15/04; G06T 15/005; G06T 11/60;
(Continued)

(56) References Cited

U.S. PATENT DOCUMENTS 11,114,068 B1 * 9/2021 Alameh .................. G09G 5/38
11,605,365 B2 * 3/2023 Alameh .................. G06F 3/147
(Continued)

OTHER PUBLICATIONS

Ashish, , "How Do Smartphones Know Which Is The Right Side Up?", Published on or before Dec. 2, 2019; Viewed online Jul. 13, 2020 at https://www.scienceabc.com/innovation/smartphones-change-orientation-horizontal-landscape-gravity-sensor-accelerometer.html.
(Continued)

*Primary Examiner* — Todd Buttram
(74) *Attorney, Agent, or Firm* — Philip H. Burrus, IV

(57) ABSTRACT

An electronic device includes a device housing and one or more displays presenting one or more user actuation targets defining one or more virtual buttons in a predefined arrangement relative to a first end of the device housing. One or more sensors detect a condition of the electronic device, such as an approaching object, change in the direction of gravity, or an object tapping or pushing the electronic device. One or more processors cause, in response to the one or more sensors detecting the condition, the one or more displays to present the one or more user actuation targets defining the one or more virtual buttons in another predefined arrangement that is different from the predefined arrangement.

20 Claims, 9 Drawing Sheets

Related U.S. Application Data continuation of application No. 16/907,538, filed on Jun. 22, 2020, now Pat. No. 11,114,068.

(58) Field of Classification Search
CPC ..... G06T 19/00; G06T 11/00; G06F 9/44458; G06F 3/0481
See application file for complete search history.

(56) References Cited

U.S. PATENT DOCUMENTS

| | | |
|---|---|---|
| 2012/0329441 A1 | 12/2012 | Tseng |
| 2021/0398509 A1* | 12/2021 | Alameh .................. G09G 5/38 |
| 2023/0186873 A1* | 6/2023 | Alameh .................. G09G 5/38 |
| | | 345/682 |

OTHER PUBLICATIONS

Buttram, Alan, "Notice of Allowance", U.S. Appl. No. 16/907,538, filed Jun. 22, 2020; dated Jun. 14, 2021.
Buttram, Alan, "Notice of Allowance", U.S. Appl. No. 17/393,764, filed Aug. 4, 2021; dated Jan. 19, 2023.
Martonik, et al., "How to use, customize and disable Active Edge on a Google Pixel phone", Published on or before Jan. 28, 2020; Viewed online Jul. 13, 2020 at https://www.androidcentral.com/how-use-customize-disable-active-edge-google-pixel.

\* cited by examiner

METHODS AND SYSTEMS FOR ALTERING VIRTUAL BUTTON ARRANGEMENTS PRESENTED ON ONE OR MORE DISPLAYS OF AN ELECTRONIC DEVICE

CROSS REFERENCE TO PRIOR APPLICATIONS

This application is a continuation application claiming priority under 35 USC § 120 from U.S. application Ser. No. 17/393,764, filed Aug. 4, 2021, which is a continuation application claiming priority under 35 USC § 120 from U.S. application Ser. No. 16/907,538, filed Jun. 22, 2020, which is incorporated by reference for all purposes.

BACKGROUND

Technical Field

This disclosure relates generally to electronic devices, and more particularly to electronic devices with displays.

Background Art

Portable electronic device usage has become ubiquitous. Vast majorities of the population carry a smartphone, tablet computer, or laptop computer daily to communicate with others, stay in formed, to consume entertainment, and to manage their lives.

As the technology incorporated into these portable electronic devices has become more advanced, so to has their feature set. A modern smartphone includes more computing power than a desktop computer did only a few years ago. Additionally, while early generation portable electronic devices included physical keypads, most modern portable electronic devices include touch-sensitive displays. It would be advantageous to have an improved electronic device allowing more intuitive usage of these new features.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
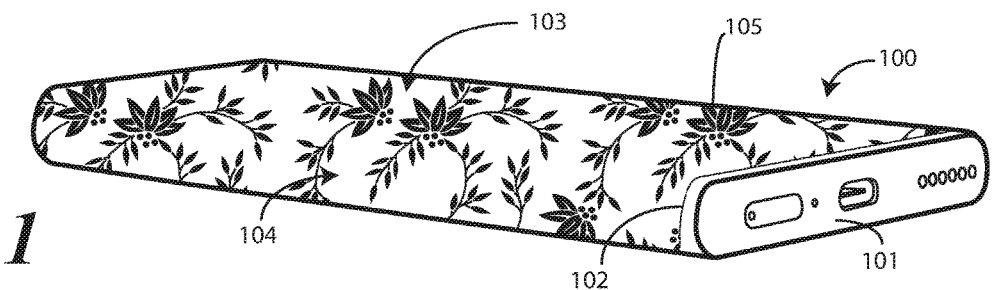
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to altering an arrangement of one or more virtual buttons presented on a display of an electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of one or more processors causing one or more displays presenting one or more user actuation targets defining one or more virtual buttons in a predefined arrangement to present those user actuation targets in a different predefined arrangement based upon one or more conditions as described herein. The non-processor circuits may include, but are not limited to, a radio receiver, a radio transmitter, signal drivers, clock circuits, power source circuits, and user input devices.

As such, these functions may be interpreted as steps of a method to perform the causing of one or more displays to present the one or more user actuation targets defining the one or more virtual buttons in another predefined arrangement that is different from a first predefined arrangement originally presented. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that electronic devices are evolving to have displays on more than just the major surfaces. For example, while conventional electronic devices frequently include a display positioned solely on a single major surface of the device housing, embodiments of the disclosure contemplate that electronic devices will soon include displays on the first major surface and second major surface as well. Embodiments of the disclosure contemplate that some designers will desire displays on the minor surfaces as well.

Embodiments of the disclosure provide as an explanatory embodiment an electronic device that includes a "wrapped" display comprising a unitary pre-formed glass fascia that is coupled to a device housing while wrapping around at least two sides of the device housing. The use of such a wrapped display eliminates seams, lines, or other mechanical features between, for example, display surfaces positioned on minor surfaces of the electronic device and display surfaces positioned on the major surfaces of the electronic device. The use of a wrapped display also provides a waterfall effect around the device housing with a continuous display surface so that content and other information can be presented without interruption.

The wrapped display used in explanatory embodiments advantageously enable new user experiences and designs. Illustrating by example, the use of this wrapped, waterfall display allows buttons that may normally be placed upon the side of the electronic device to be replaced by dynamically presented user actuation targets defining one or more virtual buttons. In one or more embodiments, a unitary pre-formed glass fascia includes one or more squeeze sensors that allow the unitary pre-formed glass fascia to deflect when a user actuates one of the user actuation targets. Accordingly, physical buttons such as an up-down rocker button that can be used to control volume of audio, brightness of a display, or other functions, can be replaced by a seamless and fashionable user actuation target presented on the minor surfaces of the waterfall display.

Embodiments of the disclosure contemplate that while such virtual buttons are stylish, sleek, and elegant, the fact that the waterfall display is smooth along its surface can make it challenging for a user to determine the orientation of the electronic device, especially when using the sense of touch only. While electronic devices having physical buttons make it possible to run a finger along the side of the device to determine which end is up and where the physical buttons are located, electronic devices configured with either segmented displays on the minor surfaces or a waterfall display defined by a unitary pre-formed glass fascia in accordance with embodiments of the present disclosure make this tactile discovery process challenging. Additionally, actuation of the user actuation targets defining the virtual buttons can be a challenge as well because a user may not be able to guess where the user actuation target is positioned by touch alone.

Embodiments of the disclosure provide a solution to these problems. In one or more embodiments, one or more processors of an electronic device having one or more displays presenting one or more user actuation targets defining one or more virtual buttons in a predefined arrangement relative to a first end of the device housing are operable to cause the one or more displays to present the one or more user actuation targets defining the one or more virtual buttons in another predefined arrangement that is different from the initial predefined arrangement in response to one or more conditions. Illustrating by example, in one embodiment, one or more sensors of the electronic device detect an object approaching a portion of the electronic device when the electronic device is in an enclosed condition, such as when the electronic device is within a pocket. When this occurs, and when this portion of the electronic device is a distal portion of the electronic device from the first end of the device housing, the one or more processors reverse the predefined arrangement of the one or more virtual buttons by causing the one or more displays to one or more displays to present the one or more user actuation targets defining the one or more virtual buttons in another predefined arrangement that is different from the initial predefined arrangement. Thus, when the electronic device is positioned within a pocket, and a hand reaches into the pocket, whichever end the hand approaches or touches first becomes the "top" of the electronic device. Accordingly, if a "volume up" user actuation target is typically oriented at the top end of the electronic device, the person can simply grasp the side of the electronic device at the (now) "top" to turn up the volume.

In another embodiment, one or more sensors of the electronic device detect a reversal of a direction of gravity relative to the device housing due to the electronic device being turned over. In one or more embodiments, when this occurs, the one or more processors cause any user actuation targets defining virtual buttons to reverse their predefined arrangement. Said differently, of the one or more displays are presenting one or more user actuation targets defining one or more virtual buttons prior to the one or more sensors detecting the reversal of the direction of gravity in a predefined arrangement, in one or more embodiments the one or more processors cause the one or more displays to present the one or more user actuation targets defining the one or more virtual buttons in another predefined arrangement after the one or more sensors detect the reversal of the direction of gravity, with that other predefined arrangement being different from the predefined arrangement being presented before the electronic device was turned over.

In another embodiment, one or more sensors detect an object tapping or pushing a portion of the device housing along a direction of gravity when the electronic device is in an enclosed condition, such as when the electronic device is situated within a pocket. In one or more embodiments, when this occurs, the one or more processors cause any user actuation targets defining any virtual buttons to reverse their presentation arrangement. For example, if the one or more displays are presenting one or more user actuation targets defining one or more virtual buttons in a predefined arrangement relative to a first end of the device housing, after the one or more sensors detect the object tapping or pushing a portion of the device housing along the direction of gravity while in the enclosed condition the one or more processors cause the one or more displays to present the one or more user actuation targets defining the one or more virtual buttons in another predefined arrangement that is different from the first predefined arrangement.

By causing this change in the predefined arrangement of the virtual buttons, the electronic device simply becomes easier to use. For instance, when a person places an electronic device configured in accordance with embodiments of the disclosure, the person can simply press the upper portion of an edge of the electronic device to, for example, turn the volume up, while pressing a lower portion of an edge of the electronic device to turn the volume down. Embodiments of the disclosure allow the person to do this without having any knowledge of the actual orientation of the electronic device within the pocket, or without forcing the user to pull the device out of pocket to view and actuate the right touch button.

Advantageously, if the person places the electronic device "right side" up in a pocket, the person can adjust the volume up (or perform another control operation) without looking at the electronic device by simply squeezing the upper portion of the side of the electronic device (in this case no reversal function performed). In one or more embodiments, this can even be done through clothing, although sliding the hand into the pocket works as well. If, however, the person places the electronic device "upside down" in the pocket, they can perform exact same operation to adjust the volume accordingly. They simply squeeze the upper portion of the side of the electronic device to turn the volume up.

Turning now to FIG. 1, illustrated therein is one explanatory electronic device 100 configured in accordance with one or more embodiments of the disclosure. As shown in FIG. 1, the electronic device 100 includes a device housing 101 and a pre-formed display assembly 102. The pre-formed display assembly 102 is coupled to, and wraps around at least two sides 103,104 of the device housing 101. The pre-formed display assembly 102 is unique in that it is a unitary display with contours that span and wrap about at least one minor surface, e.g., side 104, while also spanning at least one major surface, e.g., side 103. The electronic device 100 of FIG. 1 includes a pre-formed display assembly 102 that is continuous, unitary, and unbroken as it passes, for example, from side 103 to side 104.

Advantageously, the pre-formed display assembly 102 provides a desirable feature for electronic devices such as smartphones, tablet computers, laptop computers, and the like. In contrast to prior art electronic devices that have multiple displays with many elements, the electronic device 100 of FIG. 1, with its pre-formed display assembly 102, allows for, in one or more embodiments, the device housing 101 to be fully wrapped by the unitary, continuous, pre-formed display assembly 102. This pre-formed display assembly 102 can be referred to as a "waterfall" display because imagery 105 presented on the pre-formed display assembly 102 spill from the major surfaces of the pre-formed display assembly 102 spanning the major surfaces of the device housing 101 to the curved contours of the pre-formed display assembly 102 spanning the minor surfaces of the device housing 101, thereby cascading about the device housing 101 like water going over a waterfall. As will be described below with reference to FIG. 4, in one or more embodiments these waterfall side portions can be used to present one or more user actuation targets defining one or more virtual buttons.

Figure 2:
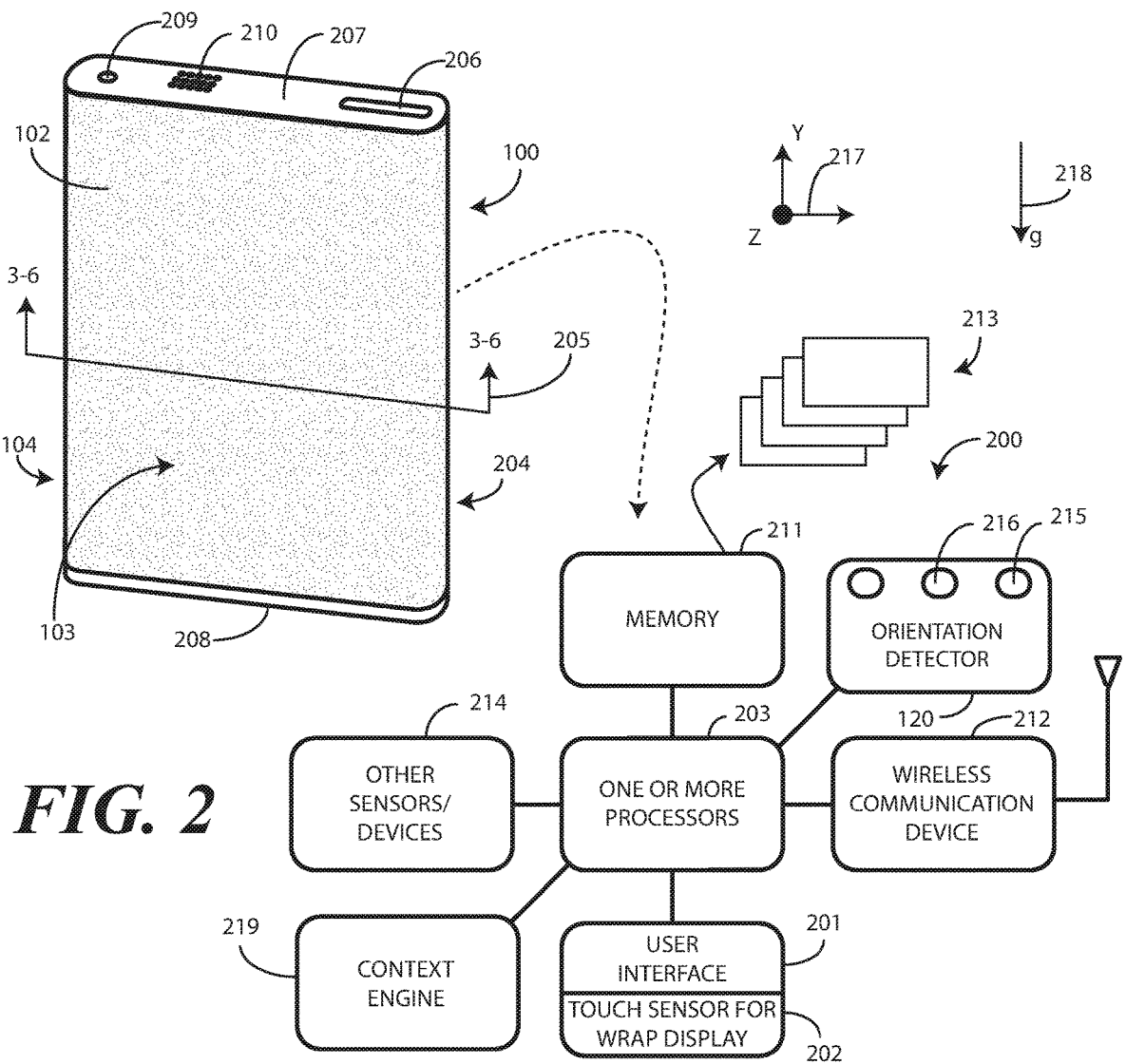
FIG. 2 illustrates an explanatory block diagram schematic for one electronic device configured in accordance with one or more embodiments of the disclosure.

Turning now to FIG. 2, illustrated therein the explanatory electronic device 100 of FIG. 1. As shown, the electronic device 100 includes the device housing 101 and the pre-formed display assembly 102. By comparing FIGS. 1 and 2, it can be seen that the pre-formed display assembly 102 spans at least three major faces of the device housing 101. These include a first major surface of the device housing 101, i.e., side 103, a first minor face of the device housing 101, i.e., side 104, and a second minor face of the device housing 101, i.e., side 204.

It should be noted that while the pre-formed display assembly 102 spans the device housing 101 horizontally in FIG. 2, embodiments of the disclosure are not so limited. This "belt like" arrangement of the pre-formed display assembly 102 about the device housing 101 is illustrative only. In other embodiments, the pre-formed display assembly 102 can be rotated by ninety degrees so as to span the front major surface of the device housing 101, the top surface of the device housing 101, the bottom surface of the device housing 101, and the rear major surface of the device housing 101. Moreover, while the device housing 101 of FIG. 1 is substantially rectangular with a cross section 205 that is obround, embodiments of the disclosure are not so limited. The pre-formed display assembly 102 can be formed to span any number of surfaces. Thus, if the device housing 101 had a cross section 205 with four, five, six, or more surfaces, the pre-formed display assembly 102 could have its unitary pre-formed fascia's interior surfaces correspond to the exterior surfaces of the device housing 101. Thus, while one illustrative pre-formed display assembly 102 and device housing 101 configuration and/or arrangement are shown in FIG. 2 for illustrative purposes, numerous others will be obvious to those of ordinary skill in the art having the benefit of this disclosure.

Additionally, it should be noted that the electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the electronic device 100 could be other types of devices as well, including palm-top computers, tablet computers, gaming devices, media players, wearable devices, or other portable wireless communication devices. Still other devices will be obvious to those of ordinary skill in the art having the benefit of this disclosure.

Also illustrated in FIG. 2 is one explanatory block diagram schematic 200 of the explanatory electronic device 100. It should be understood that the block diagram schematic 200 is provided for illustrative purposes only and for illustrating components of one electronic device 100 in accordance with embodiments of the disclosure, and is not intended to be a complete block diagram schematic 200 of the various components that can be included with the electronic device 100. Therefore, other electronic devices in accordance with embodiments of the disclosure may include various other components not shown in FIG. 2, or may include a combination of two or more components or a division of a particular component into two or more separate components, and still be within the scope of the present disclosure.

In one or more embodiments, the block diagram schematic 200 is configured as a printed circuit board assembly disposed within the device housing 101 of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one or more embodiments, the device housing 101 of the electronic device 100 defines a first major surface at side 103 and a second major surface disposed on the opposite side of the first major surface. In one or more embodiments, the first major surface and the second major surface are separated by one or more minor surfaces defined by side 104 and side 204. In one or more embodiments, a user interface 201 of the electronic device 100 includes the pre-formed display assembly 102, which wraps and envelops the first major surface and at least two minor surfaces.

In one or more embodiments, the pre-formed display assembly 102 is unitary in that it provides a single display that wraps about the device housing 101 of the electronic device 100. The pre-formed display assembly 102 has a first portion that serves as a first display spanning a first major surface of the device housing 101, a second portion that wraps around the minor surface defined by side 104, and a third portion that wraps around the minor surface defined by side 104.

In one or more embodiments, the pre-formed display assembly 102 comprises a touch sensitive display. Where so configured, information, graphical objects, user actuation targets, and other graphical indicia can be presented on any portion of the pre-formed display assembly 102. In one or more embodiments, so as to be touch sensitive, the pre-formed display assembly 102 comprises a corresponding touch sensor 202.

In one or more embodiments, the touch sensor 202 can comprise any of a capacitive touch sensor, an infrared touch sensor, resistive touch sensors, another touch-sensitive technology, or combinations thereof. Capacitive touch-sensitive devices include a plurality of capacitive sensors, e.g., electrodes, which are disposed along a substrate. Where so configured, each capacitive sensor can be configured, in conjunction with associated control circuitry, e.g., the one or more processors 203 operable with the pre-formed display assembly 102, to detect an object in close proximity with—or touching—a surface of the pre-formed display assembly 102 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Indium-tin-oxide is capable of being deposited upon the substrate in thin layers by way of a printing process. The capacitive sensors may also be deposited on the substrate by electron beam evaporation, physical vapor deposition, or other various sputter deposition techniques. As will be described below, this substrate can then be laminated to the unitary pre-formed fascia when it is loaded so as to separate at least two surfaces of the same.

In one or more embodiments, users can deliver user input to the pre-formed display assembly 102 by delivering touch input from a finger, stylus, or other objects disposed proximately with the pre-formed display assembly 102. In one embodiment, the pre-formed display assembly 102 is configured as an active matrix organic light emitting diode (AMOLED) display. However, it should be noted that other types of displays, including liquid crystal displays, are suitable for use with the user interface and would be obvious to those of ordinary skill in the art having the benefit of this disclosure.

Other features can be situated on the device housing 101 on surfaces not enveloped or covered by the pre-formed display assembly 102. For instance, a user interface component 206 such as a button or other control device can be disposed on either the top surface 207 or bottom surface 208 of the device housing 101 to facilitate additional control of the electronic device 100. Other features can be added, and can be located on top surface 207 or bottom surface 208 (or side surface if the pre-formed display assembly 102 is rotated by ninety degrees). Illustrating by example, in one or more embodiments an imager 209 or a loudspeaker 210 can be positioned on either the top surface 207 or the bottom surface 208. As shown in FIG. 1, one or more connectors (120) can be positioned on the bottom surface 208 of the electronic device as well. Such connectors (120) can be used to couple the electronic device 100 to various accessory devices, such as a headset, headphones, a charger, or other accessory device.

In one embodiment, the electronic device includes one or more processors 203. In one embodiment, the one or more processors 203 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. For example, in one embodiment the one or more processors 203 comprise one or more circuits operable to present content or presentation information, such as images, text, and video, on the pre-formed display assembly 102. A storage device, such as memory 211, can optionally store the executable software code used by the one or more processors 203 during operation.

In this illustrative embodiment, the block diagram schematic 200 also includes a communication circuit 212 that can be configured for wired or wireless communication with one or more other devices or networks. The networks can include a wide area network, a local area network, and/or personal area network. The communication circuit 212 may also utilize wireless technology for communication, such as, but are not limited to, peer-to-peer or ad hoc communications such as HomeRF, Bluetooth and IEEE 802.11, and other forms of wireless communication such as infrared technology. The communication circuit 212 can include wireless communication circuitry, one of a receiver, a transmitter, or transceiver, and one or more antennas.

In one embodiment, the one or more processors 203 can be responsible for performing the primary functions of the electronic device with which the block diagram schematic 200 is operational. For example, in one embodiment the one or more processors 203 comprise one or more circuits operable with the pre-formed display assembly 102 to present presentation information to a user. The executable software code used by the one or more processors 203 can be configured as one or more modules 213 that are operable with the one or more processors 203. Such modules 213 can store instructions, control algorithms, and so forth.

Other components 214 can be included with the electronic device 100. Illustrating by example, the other components 214 can include an audio input/processor. The audio input/processor can receive audio input from an environment about the electronic device 100. The audio input/processor can include hardware, executable code, and speech monitor executable code in one embodiment.

In one or more embodiments, the other components 214 can include various sensors operable with the one or more processors 203. These sensors can include a geo-locator that serves as a location detector, an orientation detector that determines an orientation and/or movement of the electronic device 100 in three-dimensional space, an imager 209, a face analyzer, an environmental analyzer, and gaze detector. The orientation detector can include an accelerometer, gyroscope(s), or other device to detect device context, such as being in a pocket, as well as orientation and/or motion of the electronic device 100.

The other components 214 can also include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 214 can also include proximity sensors. The proximity sensors can fall in to one of two camps: active proximity sensors that include a transmitter and receiver pair, and "passive" proximity sensors that include a receiver only. Either the proximity detector components or the proximity sensor components can be generally used for gesture control and other user interface protocols in one or more embodiments.

The other components 214 can optionally include a barometer operable to sense changes in air pressure due to elevation changes or differing pressures of the electronic device 100. The other components 214 can also optionally include a light sensor that detects changes in optical intensity, color, light, or shadow in the environment of an electronic device.

The other components 214 can also include one or more motion sensors 215 can be configured as an orientation detector 216 that determines an orientation and/or movement of the electronic device 100 in three-dimensional space 217. Illustrating by example, the orientation detector 216 can include an accelerometer, gyroscope(s), or other device to detect device orientation and/or motion of the electronic device 100. Using an accelerometer as an example, an accelerometer can be included to detect motion of the electronic device 100 in the three-dimensional space 217. Additionally, the accelerometer can be used to sense some of the gestures of the user, such as one talking with their hands, running, or walking.

In one or more embodiments, the orientation detector 216 can determine the spatial orientation of an electronic device 100 in three-dimensional space 217 by, for example, detecting a direction of gravity 218. In addition to, or instead of, an accelerometer, an electronic compass can be included to detect the spatial orientation of the electronic device 100 relative to the earth's magnetic field. Similarly, one or more gyroscopes can be included to detect rotational orientation of the electronic device 100 in the three-dimensional space 217. Other examples of orientation detectors will be obvious to those of ordinary skill in the art having the benefit of this disclosure.

A context engine 219 can then operable with the other components 214 to detect, infer, capture, and otherwise determine persons and actions that are occurring in an environment about the electronic device 100. For example, where included one embodiment of the context engine 219 determines assessed contexts and frameworks using adjustable algorithms of context assessment employing information, data, and events. These assessments may be learned through repetitive data analysis or via machine learning and training. Alternatively, a user may employ the user interface to enter various parameters, constructs, rules, and/or paradigms that instruct or otherwise guide the context engine 219 in detecting multi-modal social cues, emotional states, moods, and other contextual information. The context engine 219 can comprise an artificial neural network or other similar technology in one or more embodiments.

Figure 3:
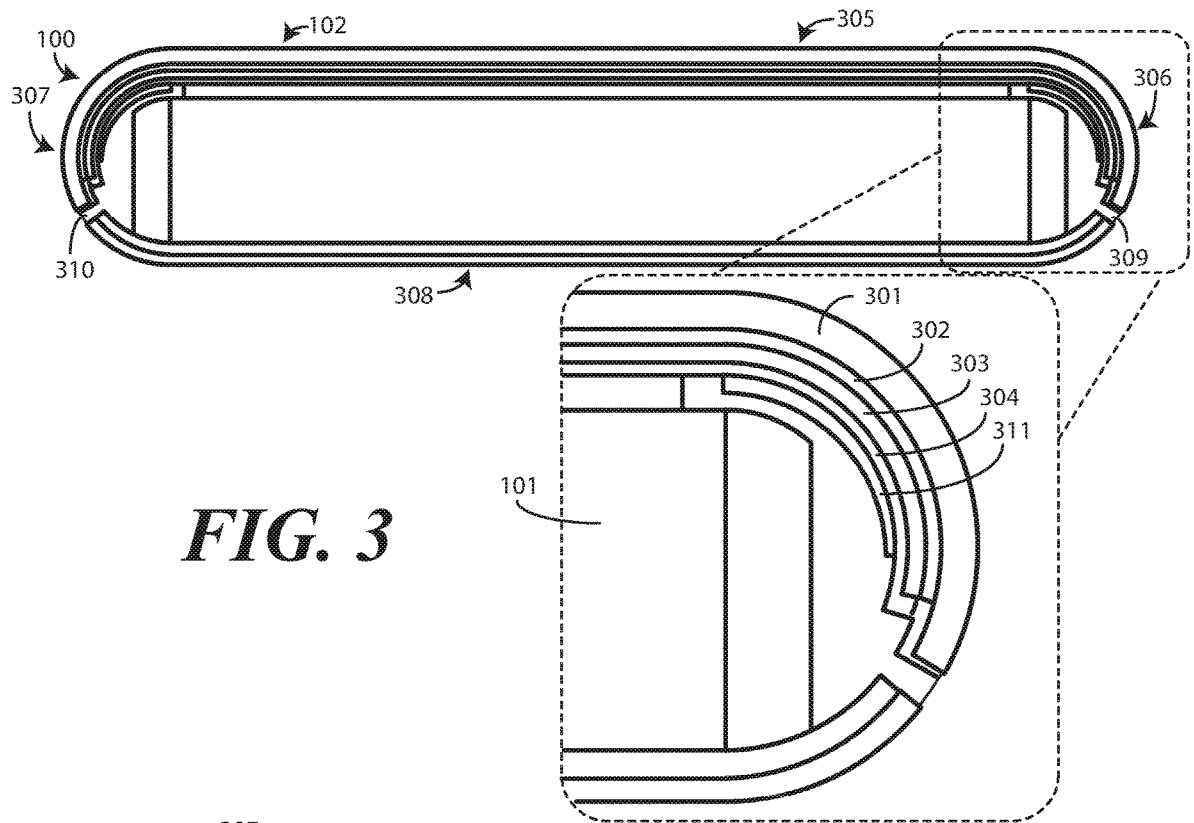
FIG. 3 illustrates a cross sectional view of one explanatory display assembly in accordance with one or more embodiments of the disclosure.

Turning now to FIG. 3, illustrated therein is a view of the electronic device 100, including the pre-formed display assembly 102, taken at cross section (205), which allows the various components of the pre-formed display assembly 102 to be seen. In one or more embodiments, the electronic device 100 includes the device housing 101 and the pre-formed display assembly 102. As shown in FIG. 3, the pre-formed display assembly 102 wraps around at least two sides of the device housing 101. In this illustrative embodiment, the pre-formed display assembly 102 wraps not only around at least three sides of the device housing 101, but around three sides of the device housing 101.

As shown in FIG. 3, in one or more embodiments the pre-formed display assembly 102 comprises one or more layers that are coupled or laminated together to complete the pre-formed display assembly 102. In one or more embodiments, these layers comprise a unitary pre-formed fascia 301, a first adhesive layer 302, a flexible display 303, an optional second adhesive layer (not shown but would be like the first adhesive layer 302 but positioned on the interior surface of the flexible display 303), and an optional substrate 304. An optional third adhesive layer could be positioned between the optional substrate (304), where employed, or on the interior surface of the flexible display 303 to couple the pre-formed display assembly 102 to the device housing 101. Other configurations of layers suitable for manufacturing the pre-formed display assembly 102 will be obvious to those of ordinary skill in the art having the benefit of this disclosure.

Beginning from the top of the layer stack, in one or more embodiments the unitary pre-formed fascia 301 comprises an optically transparent substrate. In one or more embodiments the unitary pre-formed fascia 301 may be manufactured from an optically transparent material. This material can be any of a variety of materials. Examples include a thin film sheet of a thermoplastic material. Illustrating by example, in one embodiment the unitary pre-formed fascia 301 is manufactured from a layer of optically transparent polyamide. In another embodiment, the unitary pre-formed fascia 301 is manufactured from a layer of optically transparent polycarbonate.

In the illustrative embodiment of FIG. 3, the unitary pre-formed fascia 301 is manufactured from glass, and comprises a unitary pre-formed glass fascia. In one or more embodiments the unitary pre-formed glass fascia is manufactured from a chemically treated glass. The unitary pre-formed glass fascia can be strengthened using an ion exchange process. In such a process, the unitary pre-formed glass fascia can be placed into a high temperature salt bath where ions are introduced into the surface of the unitary pre-formed glass fascia, thereby strengthening the same. In one or more embodiments, the unitary pre-formed glass fascia has a thickness of between 0.3 millimeters and 0.6 millimeters. For instance, in one embodiment the unitary pre-formed glass fascia has a thickness of about 0.5 millimeters. Testing and simulation has demonstrated that where the unitary pre-formed glass fascia is so configured, it can be deformed by squeezing the sides of the electronic device 100, thereby compressing one or more gaps 309 defined by the unitary pre-formed glass fascia.

The unitary pre-formed glass fascia of FIG. 3 has an obround shape that includes a first major surface 305 and at least one arched bridging member. The unitary pre-formed glass fascia of FIG. 3 includes two arched bridging members, namely, a first arched bridging member 306 and a second arched bridging member 307. In this illustrative embodiment, the first major surface 305 is substantially planar. In other embodiments, the first major surface 305 can include convex or concave contours rather than substantially planar ones. In the illustrative embodiment of FIG. 3, the first arched bridging member 306 and the second arched bridging member 307 each define a partially circular cross section. In other embodiments, the first arched bridging member 306 and the second arched bridging member 307 will have other curved contours.

In this illustrative embodiment, the first arched bridging member 306 is positioned about a first minor surface of the device housing 101. Since this unitary pre-formed glass fascia includes two arched bridging members, the second arched bridging member 307 is also positioned about a second minor surface of the device housing 101. Here, the first major surface 305 physically separates the first arched bridging member 306 and the second arched bridging member 307.

In one or more embodiments, the first arched bridging member 306 and the second arched bridging member 307 each terminate at a gap situated between the unitary pre-formed glass fascia and a rear fascia 308 spanning the rear surface of the device housing 101. In one or more embodiments, the gap 309,310 runs the length of the unitary pre-formed glass fascia, which means that the gap 309,310 spans the length (into the page) of the unitary pre-formed glass fascia.

In one or more embodiments, when the unitary pre-formed fascia 301 is manufactured from glass to define a unitary pre-formed glass fascia, and where the glass is chemically strengthened, testing and simulation demonstrates that the glass can be deformed. Illustrating by example, in one or more embodiments a user can press either the first arched bridging member 306 or the second arched bridging member 307 to compress its respective gap 309, 310. In one or more embodiments, one or more piezoelectric sensors 311 can be positioned along the interior surface of the unitary pre-formed fascia 301 to detect this compression. Advantageously, this allows either the first arched bridging member 306 or the second arched bridging member 307 to be used as a switch, button, or other control mechanism.

Where, for example, the unitary pre-formed glass fascia is manufactured from chemically strengthened glass having a thickness of about half a millimeter, the first arched bridging member 306 and the second arched bridging member 307 can be compressed inward by loading forces, thereby compressing the gap 309,310, with the glass strain remaining well under one percent. Thus, in one or more embodiments the unitary pre-formed fascia 301 comprises a unitary pre-formed glass fascia where at least one of the first arched bridging member 306 or the second arched bridging member 307 is deformable relative to the first major surface 305 to compress at least one of gap 309 or gap 310. The one or more piezoelectric sensors 311 can detect this deflection. Where one or more user actuation targets defining one or more virtual buttons are presented on either the first arched bridging member 306 or the second arched bridging member 307, the location of the touch, as detected by the touch sensor (202), and the compression of the arched bridge member, functions as a control mechanism to control operations of the electronic device in one or more embodiments.

In one or more embodiments the unitary pre-formed fascia 301 functions as a fascia by defining a cover for the flexible display 303. In one or more embodiments the unitary pre-formed fascia 301 is optically transparent, in that light can pass through the unitary pre-formed fascia 301 so that objects behind the unitary pre-formed fascia 301 can be distinctly seen. The unitary pre-formed fascia 301 may optionally include a ultra-violet barrier. Such a barrier can be useful in improving the visibility of flexible display 303 in one or more embodiments.

Beneath the unitary pre-formed fascia 301 is a first adhesive layer 302, which is coupled to the interior major surface of the unitary pre-formed fascia 301. In one or more embodiments, the first adhesive layer 302 comprises an optically transparent adhesive. Said differently, in one or more embodiments the first adhesive layer 302 comprises an optically pellucid adhesive layer coupling the flexible display 303 to the interior major surface of the unitary pre-formed fascia 301.

The optically transparent adhesive can be applied to two sides of a thin, optically transparent substrate such that the first adhesive layer 302 functions as an optically transparent layer having optically transparent adhesive on both sides. Where so configured, in one or more embodiments the first adhesive layer 302 has a thickness of about fifty microns. This optically transparent version of "double-sided tape" can then be spooled and applied between the unitary pre-formed fascia 301 and the flexible display 303 to couple the two together.

In other embodiments the first adhesive layer 302 will instead be applied between the unitary pre-formed fascia 301 and the flexible display 303 as an optically transparent liquid, gel, as a homogeneous adhesive layer, or in the form of another medium. Where so configured, the first adhesive layer 302 can optionally be cured by heat, ultraviolet light, or other techniques. Other examples of materials suitable for use as the first adhesive layer 302 will be obvious to those of ordinary skill in the art having the benefit of this disclosure. In one or more embodiments, the first adhesive layer 302 mechanically couples the flexible display 303 to the interior surfaces of the unitary pre-formed fascia 301.

In one or more embodiments, the flexible display 303 is coupled to the interior major surface of the unitary pre-formed fascia 301. In the illustrative embodiment of FIG. 3, the flexible display 303 is situated between the optional substrate 304 and the unitary pre-formed fascia 301. In other embodiments, a layer above the flexible display 303 can be configured with enough stiffness to make the optional substrate 304 unnecessary. For example, in an embodiment where the unitary pre-formed fascia 301 is manufactured from chemically strengthened glass as a unitary pre-formed glass fascia, the optional substrate 304 may be omitted.

The flexible display 303 can optionally be touch-sensitive. In one or more embodiments, the flexible display 303 is configured as an organic light emitting diode (OLED) display layer coupled to the a flexible substrate, which allows the flexible display 303 to bend in accordance with various bending radii defined by the unitary pre-formed fascia 301. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display 303 may be formed from multiple layers of flexible material such as flexible sheets of polymer or other materials. Illustrating by example, the flexible display 303 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display 303 has a thickness of about 130 microns.

In one or more embodiments, so as to be touch sensitive, the flexible display 303 includes a layer including one or more optically transparent electrodes. In one or more embodiments, the flexible display 303 includes an organic light emitting diode layer configured to present images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display 303. Other layers suitable for inclusion with the flexible display 303 will be obvious to those of ordinary skill in the art having the benefit of this disclosure.

In one or more embodiments, where the optional substrate 304 is included, the flexible display 303 can be coupled to the optional substrate 304 by a second adhesive layer, which would be like the first adhesive layer 302, although not necessarily optically transparent, and would be situated between the optional substrate 304 and the flexible display 303. In one or more embodiments, to simplify manufacture, the second adhesive layer would be identical to the first adhesive layer 302, comprising an optically transparent adhesive. However, since the second adhesive layer is coupled between the flexible display 303 and the optional substrate 304, i.e., under the flexible display 303, an optically transparent adhesive is not a requirement. The second adhesive layer could be partially optically transparent or not optically transparent at all in other embodiments.

Regardless of whether the second adhesive layer is optically transparent, in one or more embodiments the adhesive of the second adhesive layer is applied to two sides of a thin, flexible substrate. Where so configured, in one or more embodiments the second adhesive layer has a thickness of about fifty microns. This extremely thin version of "double-sided tape" can then be spooled and applied between the flexible display 303 and the optional substrate 304 to couple the two together.

In other embodiments, as with the first adhesive layer 302, the second adhesive layer will instead be applied between the flexible display 303 and the foldable substrate as a liquid, gel, as a homogeneous layer, or in the form of another medium. Where so configured, the second adhesive layer can optionally be cured by heat, ultraviolet light, or other techniques. Other examples of materials suitable for use as the second adhesive layer will be obvious to those of ordinary skill in the art having the benefit of this disclosure.

Where included, the optional substrate 304 is coupled to the flexible display 303 and defines a mechanical support for the flexible display 303 due to the fact that the optional substrate 304 is the stiffest layer of the unitary pre-formed display assembly 102 other than the unitary pre-formed fascia 301. In one or more embodiments the optional substrate 304 is manufactured from stainless steel with a thickness of about forty microns. In another embodiment, the optional substrate 304 is manufactured from a flexible plastic. Other materials from which the optional substrate 304 can be manufactured will be obvious to those of ordinary skill in the art having the benefit of this disclosure.

A third optional layer can then be positioned between the device housing 101 and the optional substrate 304, where included, or the flexible display 303. In one or more embodiments, to simplify manufacture, the third adhesive layer would be identical to the first adhesive layer 302, comprising an optically transparent adhesive. However, since the third adhesive layer is coupled between the device housing 101 and the optional substrate 304, where included, or the flexible display 303, i.e., interior of the flexible display 303, an optically transparent adhesive is not a requirement. The third adhesive layer could be partially optically transparent or not optically transparent at all in other embodiments.

In the illustrative embodiment of FIG. 3, the unitary pre-formed fascia 301 wraps around at least two sides of the device housing 101. In this embodiment, the unitary pre-formed fascia 301 wraps around three sides of the device housing 101 due to the fact that the unitary pre-formed fascia 301 includes both a first arched bridging member 306 and a second arched bridging member 307. In other embodiments, the unitary pre-formed fascia 301 will include only one arched bridging member and will wrap about only two sides of the device housing 101.

It should be noted that while the unitary pre-formed fascia 301 with the first arched bridging member 306 and second arched bridging member 307, each of which can be actuated by compression, is used as an explanatory embodiment to describe the various methods steps of FIGS. 5-10 below, in other embodiments the unitary pre-formed fascia 301 could be replaced with two or three segmented displays. For example, a first display could spans the first major surface of the device housing 101, while a second, separate display spans a minor face of the device housing 101. Similarly, a first display could span the first major surface of the device housing 101, while a second display spans a first minor surface of the device housing 101 and a third display spans a second minor surface of the device housing 101, and so forth. Thus, while the unitary pre-formed fascia 301 of FIG. 3 will be used as an explanatory embodiment, embodiments of the disclosure are not so limited. The methods described below with reference to FIGS. 5-10 could be used with any electronic device employing one or more displays to present one or more user actuation targets defining one or more virtual buttons along major or minor surfaces of the electronic device.

Figure 4:
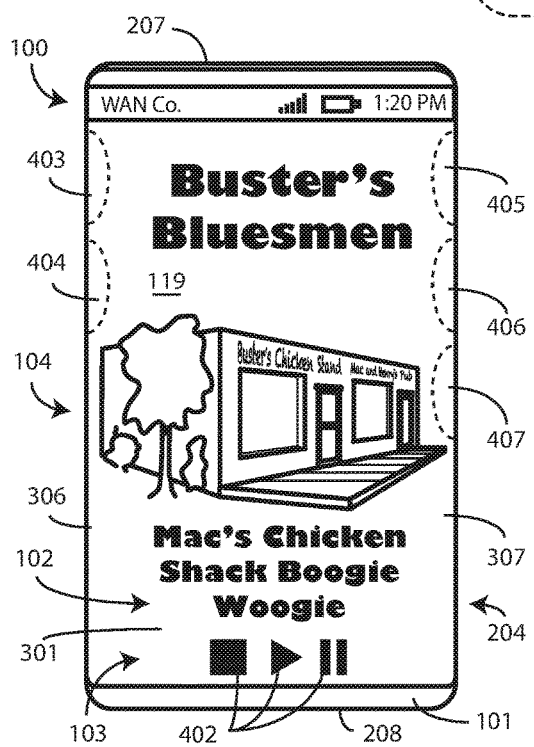
FIG. 4 illustrates one explanatory electronic device operating in accordance with one or more embodiments of the disclosure.

Turning now to FIG. 4, illustrated therein is the electronic device 100 in operation. As shown, the pre-formed display assembly 102 is presenting content 119. The content 119 could take any number of forms. The content can include static content, e.g., pictures, dynamic content, e.g., video, a combination of the two, user actuation targets, interactive content, or other forms of content. Still other types of content suitable for presentation on the display of an electronic device will be obvious to those of ordinary skill in the art having the benefit of this disclosure.

In this illustrative embodiment, the content 119 is in the form of a music player since the electronic device 100 is operating in a music player mode. The content 119 presents the name of a song being played, which in this case is Mac's Chicken Shack Boogie Woogie by the infamous Buster and his Bluesmen. The artist, album cover, and song title are all presented as content 119 on the pre-formed display assembly 102. In addition to these items, the pre-formed display assembly 102 also presents one or more user actuation targets 402 with which a user may interact to play, pause, or stop the song.

Since the pre-formed display assembly 102 comprises the unitary pre-formed fascia 301 with the first arched bridging member 306 and second arched bridging member 307 serving as display portions spilling with a waterfall effect about sides of the device housing 101, additional content can be presented here as well. In one or more embodiments, the pre-formed display assembly 102 presents one or more user actuation targets 403,404,405,406,407 defining one or more virtual buttons along minor faces, e.g., the left side and right side, of the device housing 101.

Since the pre-formed display assembly 102 comprises the unitary pre-formed fascia (301), in this illustrative embodiment the electronic device 100 includes only a single display configured to present content 119 on each of a first major surface (side 103), a first minor surface (side 104), and a second minor surface (side 105) of the electronic device 100. The unitary pre-formed fascia (301) defines a major surface (305) spanning the front major surface of the electronic device 100, and the first arched bridging member 306 and second arched bridging member 307, each of which define curved contours spanning the left minor surface and right minor surface, respectively, of the electronic device 100. Since the pre-formed display assembly 102 presents the user actuation targets 403,404,405,406,407 on the first arched bridging member 306 and the second arched bridging member 307, in this illustrative embodiment these user actuation targets 403,404,405,406,407 are presented on the curved contours of the pre-formed display assembly 102.

In this illustrative embodiment, the first arched bridging member 306 presents one or more user actuation targets 403,404 defining one or more virtual buttons. Since the electronic device 100 is operating in a music player mode, user actuation target 403 comprises a "volume up" virtual button, while user actuation target 404 comprises a volume down virtual button. The second arched bridging member 307 is also presenting one or more user actuation targets 405,406,407 defining one or more other virtual buttons. User actuation target 405 defines a "skip forward one song" virtual button, while user actuation target 407 defines a "skip backward one song" virtual button. User actuation target 406 comprises a "shuffle playlist" virtual button.

These examples of virtual buttons are illustrative only. The types and number of virtual buttons that can be presented on the first arched bridging member 306 or the second arched bridging member 307 will vary with the mode of operation of the electronic device. For example, if the electronic device 100 were operating in a slideshow mode of operation, user actuation target 403 may be a "brightness up" virtual button, while user actuation target 404 is a "brightness down" virtual button. User actuation target 405 could be a "picture advance" virtual button while user actuation target 407 is a "picture reverse" virtual button, and so forth.

What is important in FIG. 4 is that the virtual buttons presented on the first arched bridging member 306 and the virtual buttons presented on the second arched bridging member 307 are presented in a predefined order relative to a first end, here the top surface 207 of the electronic device 100. To wit, user actuation target 403 is presented above, i.e., closer to the top surface 207 than, user actuation target 404 on the first arched bridging member 306. Similarly, user actuation target 405 is closest to the top surface 207 on the second arched bridging member 307, while user actuation target 407 is the farthest. User actuation target 406 is positioned between user actuation target 405 and user actuation target 407 on the second arched bridging member 307.

The electronic device 100 also includes a second end, here bottom surface 208, which is separated from the first end, i.e., top surface 207, by a major face of the device housing 101. The pre-formed display assembly 102 of FIG. 3 is presenting the one or more user actuation target 403,404, 405,406,407 defining the one or more virtual buttons along minor faces of the electronic device 100 situated between this first end of the device housing 101 and the second end of the device housing 101 in this illustrative embodiment.

While these virtual buttons provide a sleek and elegant look, as well as quick, simple, and intuitive control of the electronic device 100, embodiments of the disclosure contemplate that it is desirable to allow a user to blindly control the electronic device 100, e.g., turn the volume up or down when the electronic device 100 is operating in a music player mode, without visually needing to identify the actual orientation of the electronic device 100. Since the user actuation targets 403,404,405,406,407 are presented on the first arched bridging member 306 and the second arched bridging member 307, respectively, and since the first arched bridging member 306 and the second arched bridging member 307 are smooth surfaces defined by the unitary pre-formed fascia 301, a person cannot simply slide their finger up and down the first arched bridging member 306 or second arched bridging member 307 to locate the virtual buttons. While the person could experiment using trial an error by squeezing the first arched bridging member 306 and the second arched bridging member 307 at various locations, embodiments of the disclosure provide for a more intuitive, efficient, and simple process for locating the virtual buttons. These solutions will be described below with reference to FIGS. 5-10.

Figure 5:
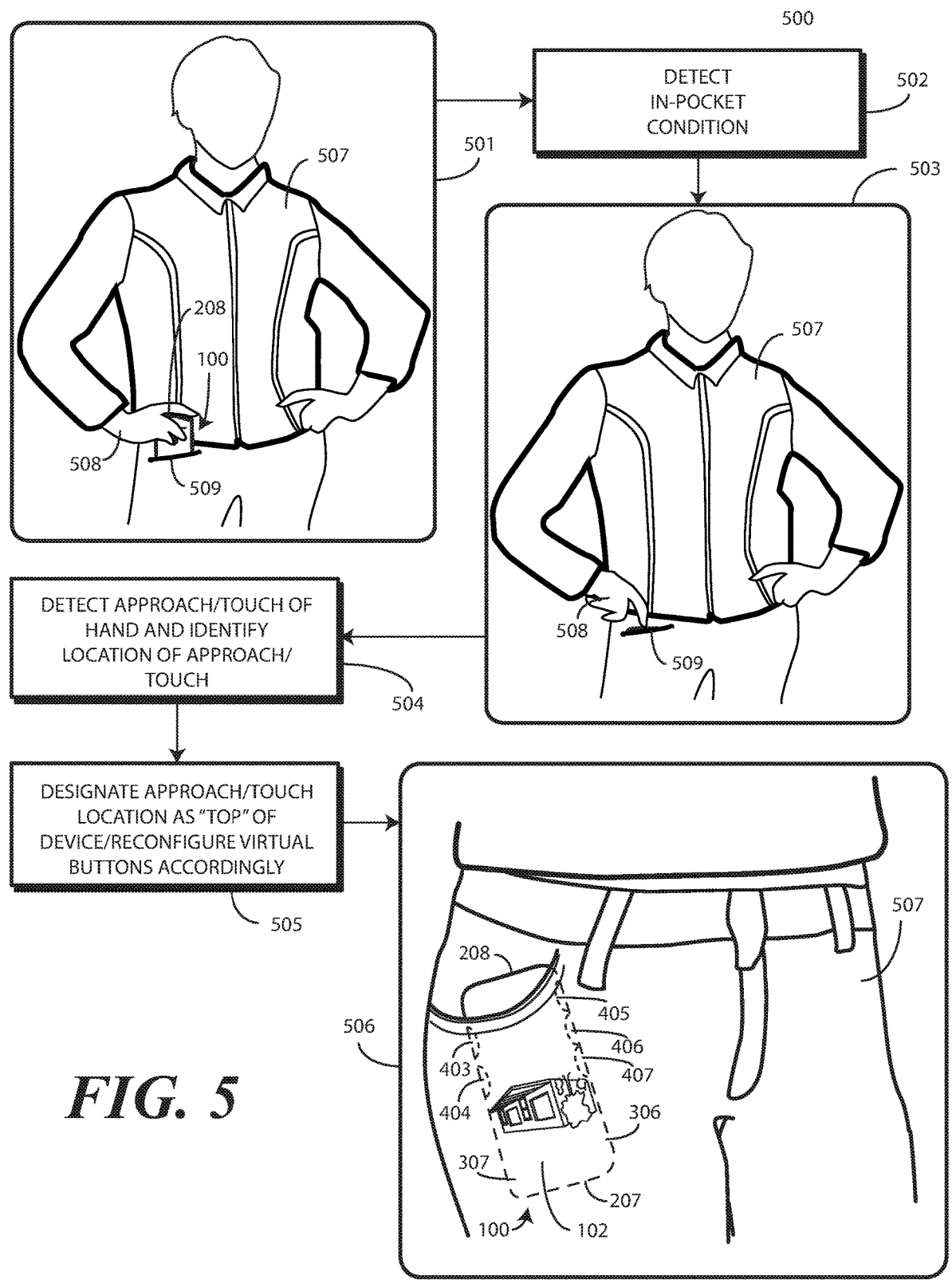
FIG. 5 illustrates one or more explanatory method steps in accordance with one or more embodiments of the disclosure.

Now that various hardware components have been described, attention will be turned to methods of using electronic devices in accordance with one or more embodiments of the disclosure, operating steps performed by electronic devices in accordance with one or more embodiments of the disclosure, and advantages, features, and benefits provided by electronic devices configured in accordance with embodiments of the disclosure. Turning first to FIG. 5, illustrated therein is one explanatory method 500 for using the electronic device 100 of FIG. 4 to quickly, easily, and simply actuate a desired user actuation target without having to visually look at the electronic device 100 or determine a physical orientation of the electronic device 100. The method 500 of FIG. 5 illustrates one explanatory electronic device 100 executing or more explanatory operating steps in accordance with one or more embodiments of the disclosure. Other methods will be described thereafter with reference to FIGS. 6-10.

In the method 500 of FIG. 5, when the electronic device 100 of FIG. 4 is inside a pocket 509 (or other enclosed condition) and a user 507 wants to activate the one or more user actuation targets 403,404,405,406,407, the user 507 slides a hand 508 into the pocket 509. In one or more embodiments, the first portion of the electronic device 100 the hand 508 touches is configured by the one or more processors (203) of the electronic device 100 as the "top" of the electronic device 100. Thus, if the user 507 touches the bottom surface (208) of the electronic device 100 first, when the pre-formed display assembly 102 is presenting the one or more user actuation targets 403,404,405,406,407 in the predefined arrangement shown in FIG. 4, in one or more embodiments the one or more processors reconfigure the pre-formed display assembly 102 such that the one or more user actuation targets 403,404,405,406 are rearranged to be in the opposite direction. The method 500 of FIG. 5 offers many benefits, one example of which is that no matter what the physical orientation of the electronic device 100 is while in the enclosed condition, such as when the user 507 is sitting on bed where the electronic device 100 could be oriented horizontally inside a pocket where accelerometer cannot be useful, the first portion of the electronic device 100 that is touched becomes the "top" of the electronic device. Thus, regardless of whether the user 507 is standing, sleeping, lying upside down, or otherwise situated, the first part of the electronic device 100 to be touched becomes the top. The one or more processors can then cause the pre-formed display assembly 102 to present the one or more user actuation targets 403,404,405 defining the one or more virtual buttons in another predefined arrangement that considers the touched portion of the electronic device 100 to be the top. It is well to note that in one or more embodiments, the touch sensor (202) remains active even when the pre-formed display assembly 102 is not presenting content. In one embodiment, the one or more processors (203) actuate the touch sensor (202), regardless of whether the pre-formed display assembly 102 is active, following pocket context detection. In other embodiments, the one or more processors (203) cause the touch sensor (202) to remain active in all cases, including those outside of a pocket.

Illustrating by example, at step 501 the user is transitioning the electronic device 100 of FIG. 4, while operating in the music player mode described in FIG. 4, to an enclosed condition by placing the electronic device 100 into a pocket 509. Without looking, the user 507 inadvertently has the electronic device 100 upside down, i.e., with the bottom surface 208 facing up. Since the electronic device 100 is operating in the music player mode, the pre-formed display assembly 102 presents the one or more user actuation targets 403,404,405,406,407 defining the one or more virtual buttons in the predefined arrangement described above with reference to FIG. 4, with user actuation target 403 closer to the top surface 207 than user actuation target 404, with user actuation target 405 closer to the top surface 207 than user actuation target 406, and so forth.

Figure 11:
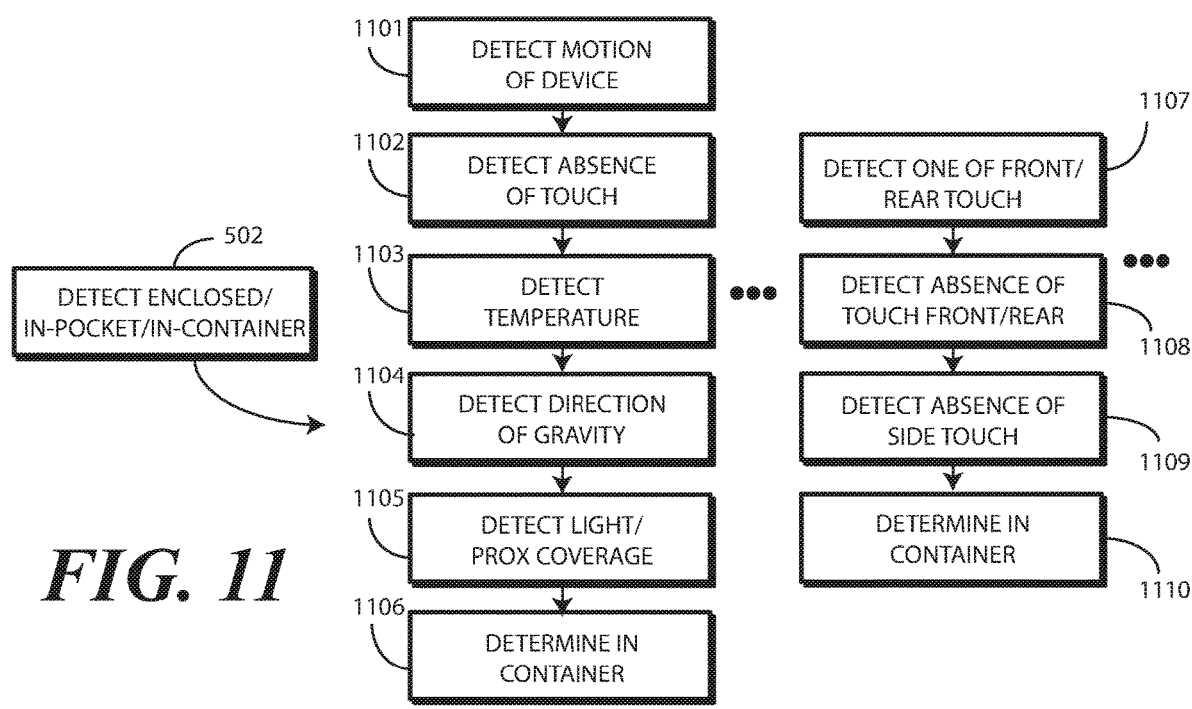
FIG. 11 illustrates one or more explanatory method steps in accordance with one or more embodiments of the disclosure.

At step 502, one or more sensors of the electronic device 100 detect that the electronic device 100 is now in the enclosed condition. This can be done in a variety of ways. Turning briefly to FIG. 11, illustrated therein are two methods by which the detection of the enclosed condition can occur.

Illustrated in FIG. 11 are two methods for performing the step 502 of detecting, with one or more sensors of the electronic device, an enclosed condition, such as when the electronic device (100) is placed in a pocket (509) or purse. Beginning with step 1101 of the first method, in one embodiment one or more processors (203) of the electronic device (100) detect motion, which can be continuous motion or, even if the user is not moving, micromotion, of the electronic device (100). The one or more processors (203) then extract parametric data from signals corresponding to the motion as delivered by the motion detector. The one or more processors (203) can then compare the motion to human motion to confirm that the electronic device (100) is disposed along a human body. When the electronic device (100) is situated in the pocket (509), the one or more processors (203) will detect human motion data.

At step 1102, the one or more processors (203) can then detect an absence of finger touch along a device housing (101) of the electronic device (100). When the electronic device (100) is disposed within the pocket (509), the one or more processors (203) will accordingly detect that the user is not touching the electronic device (100).

At step 1103, the one or more processors (203) can detect the temperature of the electronic device (100) using the temperature sensor or alternatively the proximity sensor components. This temperature detection can be done for the electronic device (100) overall, at selective locations or at a first end and at a second end. In one embodiment, the one or more processors (203) can determine if any or all of the electronic device temperature, the temperature of the first end of the electronic device (100), or the temperature at the second end of the electronic device (100) exceeds a predetermined threshold, such as eighty degrees Fahrenheit. In another embodiment, the one or more processors (203) can determine if the temperature of the first location of the electronic device (100) and/or the temperature at the second location of the electronic device (100) exceeds a predetermined threshold, such as eighty degrees Fahrenheit. Where it does not, the electronic device (100) may be stored in another vessel such as a drawer. Where it is, this optional decision can confirm that the electronic device (100) is actually disposed within the pocket (509). Moreover, this information can be used to determine which side of the electronic device (100) is facing toward the user due to which capacitive sensor is facing the body—front or back. In one or more embodiments, an accelerometer can also distinguish sliding motion as the electronic device (100) is being inserted into pocket (509) and micromotion of the user's body.

In one or more embodiments, the one or more processors (203) can detect a temperature of the electronic device (100) at both the first location and at the second location. The one or more processors (203) can determine whether these temperatures define an approximately common temperature. As noted above, in one embodiment the approximately common temperature is defined by a temperature difference that is within a predefined range. In one illustrative embodiment, the temperature difference is plus or minus two degrees centigrade. Other ranges will be obvious to those of ordinary skill in the art having the benefit of this disclosure. Where the temperature is an approximately common temperature, this can indicate that there is no significant differential as would be the case if the user were holding either the first end or the second end in their hand with the other end in the air. This is indicative of the electronic device (100) being disposed within the pocket (509). Other schemes include audio analysis indicating muffeled sound in pocket, or sudden quite of acoustical noise once inserted in pocket, or other front/back/edge cap touch sensors scheme that uniquely determine pocket, etc.

In one or more embodiments, after executing steps 1101, 1102,1103, the one or more processors (203) can confirm that the electronic device (100) is disposed within the pocket (509) when the motion corresponds to human movement, the absence of finger touch is confirmed, and the temperature at the first location and the second location is within a predefined range. Accordingly, when an electronic device (100) is placed within a pocket (509), embodiments of the disclosure confirm no side touching is occurring with a touch sensor and confirm that motion corresponds to human movement, and when both conditions are true, then confirm with either a temperature sensor or one or more proximity sensor components that a warm body is adjacent to the electronic device (100). Where proximity sensor components are used, it can be preferable to use the sensors disposed at the bottom of the electronic device (100). These can be selected based upon a determination of a gravity direction as explained below. If both bottom proximity sensor components indicate similar thermal levels, then electronic device (100) is determined to be in a pocket (509).

There are additional, optional steps that can be performed ensure that the conclusion that the electronic device (100) is disposed within the pocket (509) has a lower margin of error. Beginning with optional step 1104, in one or more embodiments the one or more processors (203) are further operable to determine a direction of gravity (218) relative to the electronic device (100).

This can be done with the accelerometer in one embodiment. In one or more embodiments, the one or more processors (203) are further operable to determine an orientation of the electronic device (100) once the electronic device (100) has been placed within the pocket (509). Accordingly, in one or more embodiments the one or more processors (203) confirm that at least a component of the gravity direction runs from a first end of the electronic device (100) to a second end of the electronic device (100) to confirm the in-pocket status, as the electronic device (100) will generally be right side up or upside down when in a front or rear pants pocket. In one embodiment, once the "most downward" pointing end is determined, the first location and the second location can be determined as a function of this end. For example, in one embodiment, both the first location and the second location are disposed at a common end, which is the most downward pointing end, or the second end in this example. This ensures that both the first location and the second location are disposed within the pocket (509).

Where a user places the electronic device (100) in a pocket (509), as was shown above at step (501) of FIG. 5, the movement used to place the electronic device (100) in the pocket (509) has associated therewith a velocity and acceleration. In one embodiment the one or more processors (203) can determine, with the motion detector whether the movement and/or motion profile, which can include velocity and acceleration, duration, and the stopping of the motion occurring during the movement exceeds a predetermined threshold. In one embodiment, a predetermined acceleration threshold is about 0.5 meters per second square, net of gravity. Embodiments of the disclosure contemplate that the user (507) will take care to ensure that the electronic device (100) is safely placed within the pocket (509). Accordingly, the movement will be slow and deliberate. Additionally, when a person is walking, the motion of the electronic device (100) will be slow as well. If a person is simply sitting in a chair and breathing, the velocity and acceleration experienced by the electronic device (100) will be low as well. By confirming that characteristics of the movement, such as velocity and acceleration are below a predefined threshold, this can serve as an additional confirmation of the in-pocket condition.

In one or more embodiments, the acceleration determination can be used in other ways as well. First, it can be used to confirm that the movement moving the electronic device (100) occurred with the direction of gravity (218), i.e., downward, as would be the case when placing the electronic device (100) in a pocket (509), but not when raising the electronic device (100) to the user's ear. Second, by comparing the acceleration to a predetermined threshold, the acceleration can be used to confirm that a user is actually placing the electronic device (100) in a pocket (509) rather than performing some other operation, such as waving the electronic device (100) around. Other uses for the acceleration data will be obvious to those of ordinary skill in the art having the benefit of this disclosure.

The one or more processors (203) can compare the movement to the direction of gravity (218). For example, in one embodiment the one or more processors (203) can determine whether at least some of the movement was against the direction of gravity (218). Similarly, in one embodiment the one or more processors (203) can determine whether a component of the direction of gravity (218) runs from a first end of the electronic device (100) to a second end of the electronic device (100).

At optional step 1105, the one or more processors (203) can further confirm that the electronic device (100) is in the pocket (509) by determining whether an object, such as clothing, textile materials, or other natural, synthetic, or blend layer is covering the electronic device (100). This determination can be made when the one or more processors (203) receive signals from the one or more proximity detector components indicating that an object, such as textile material, is less than a predefined distance from a surface of the electronic device (100), thereby indicating that the electronic device (100) is covered by the object. Where this occurs, the one or more processors (203) can further confirm that the electronic device (100) is disposed within the pocket (509). This detection of an object covering the electronic device (100) can also serve as a confirmation that the electronic device (100) is not being touched as well.

Optional step 1105 can additionally include determining, with a light sensor, whether ambient or direct light is incident on the housing of the electronic device (100). Of course, when the electronic device (100) is covered by the pocket (509), ambient or direct light is generally not incident on the device housing (101). Sometimes, some of the housing is exposed from the pocket (509). However, in most situations the vast majority of the housing is situated within the pocket (509). Modern light sensors are more than capable of determining that the majority of the device housing (101) is covered. Accordingly, in one or more embodiments the determination that the electronic device (100) is disposed within the pocket (509) can further include determining, with a light sensor, that ambient or direct light is not incident on the device housing (101). Again, that is the electronic device (100) is determined to be in the pocket (509) instead of on another surface when tilts and small motions are detected via the accelerometer combined with the electronic device (100) not being touched as determined by the touch sensors of the unitary pre-formed fascia (301) positioned along the first arched bridging member (306) and the second arched bridging member (307).

The factors listed above can be used in the function of determining whether the electronic device (100) is disposed within a pocket (509), at step 1106, alone or in combination. For example, the function can consider one, two, three, or all of the factors. Considering more factors assists in preventing false detection of the in-pocket condition. Embodiments of the disclosure contemplate that a user (507) should be minimally affected due to false detection. Accordingly, in one embodiment the one or more processors (203) consider all factors. However, subsets of the factors can be useful in many applications.

The second method of FIG. 11 is simpler. In one or more embodiments, the electronic device (100) includes at least three touch sensors. A first touch sensor can be disposed on the front major face of the electronic device (100). A second touch sensor can be disposed on the rear major face of the electronic device (100). A third touch sensor can be situated along one or more of the first arched bridging member (306) or the second arched bridging member (307).

At step 1107, the second method detects touch of a human body on either the front major face or the rear major face of the electronic device (100). For example, when the electronic device (100) is stowed within a pocket (509), a touch sensor abutting the user's leg can detect the touch of a person from a combination of the contact and temperature of the person.

At step 1108, the second method detects an absence of touch on the other of the front major face or the rear major face. For example, when the electronic device (100) is stowed within a pocket (509), a touch sensor facing away from the person will detect an absence of the touch of a person from a combination of contact and temperature.

At step 1109, the second method detects an absence of touch on the first arched bridging member (306) and second arched bridging member (307) defined by unitary pre-formed glass fascia. Where there is touch detected on one major face, and an absence of touch detected on the other major face and the minor faces defined by the sides of the electronic device (100), in one or more embodiments the second method concludes that the device is stowed within a pocket (509) at step 1110.

While two methods of detecting an electronic device (100) is in a repository container, such as a pocket (509), have been shown in FIG. 11, it should be noted that embodiments of the disclosure are not so limited. Other methods of detecting an electronic device (100) is in a repository container, such as a pocket (509) will be obvious to those of ordinary skill in the art having the benefit of this disclosure, and can be substituted for the methods described with reference to FIG. 11.

Turning now back to FIG. 5, at step 503 the user 507 is reaching her hand 508 into the pocket 509 to interact with the one or more user actuation targets 403,404,405,406,407 defining the one or more virtual buttons positioned along one or both of the first arched bridging member 306 or the second arched bridging member 307. Since the electronic device 100 is in the music player mode, the user 507 may desire, for example, to turn the volume up to better hear the magic of Buster and his Bluesmen.

At step 504, one or more sensors of the electronic device 100 detect an object, which is the hand 508 of the user 507 in this example, approaching a portion of the electronic device 100. Since the electronic device 100 is upside down in this example, the one or more sensors detect the user's hand approaching the bottom surface 208 of the electronic device 100. At step 505, the one or more processors (203) of the electronic device 100 therefore designate the bottom surface 208 as the "top" of the electronic device 100. Accordingly, since the bottom surface 208 comprises a distal portion of the device housing (101) that is physically separated from the actual "top" of the electronic device 100 (top surface 207) by the pre-formed display assembly 102, at step 505 the one or more processors (203) cause the first arched bridging member 306 and the second arched bridging member 307 of the pre-formed display assembly 102 to present the one or more user actuation targets 403,404,405,406,407 in another predefined arrangement, shown at step 506, that is different from the predefined arrangement described above with reference to FIG. 4.

Specifically, as shown at step 506, the one or more processors (203) of the electronic device cause the user actuation targets 403,404,405,406,407 defining the one or more virtual buttons in the opposite order of that shown in FIG. 4. User actuation target 403 is positioned between user actuation target 404 and the bottom surface 208 at step 506. By contrast, user actuation target 403 was positioned between the top surface 207 and user actuation target 404 in FIG. 4. Similarly, user actuation target 405 is positioned between the bottom surface 208 and user actuation target 406 at step 506 rather than between the top surface 207 and user actuation target 406 in FIG. 4.

This reversal of the predefined arrangement of the one or more user actuation targets 403,404,405,406,407 defining the one or more virtual buttons allows the user 507 to simply touch a side of the electronic device 100 closest to whichever end is upward to interact, for example, with user actuation target 403 or user actuation target 405. Since the locations of these user actuation targets 403,405 is known, the user 507 can simply slide their finger further down the first arched bridging member 306 or second arched bridging member 307 to interact with the other user actuation targets 404,406,407.

Figure 6:
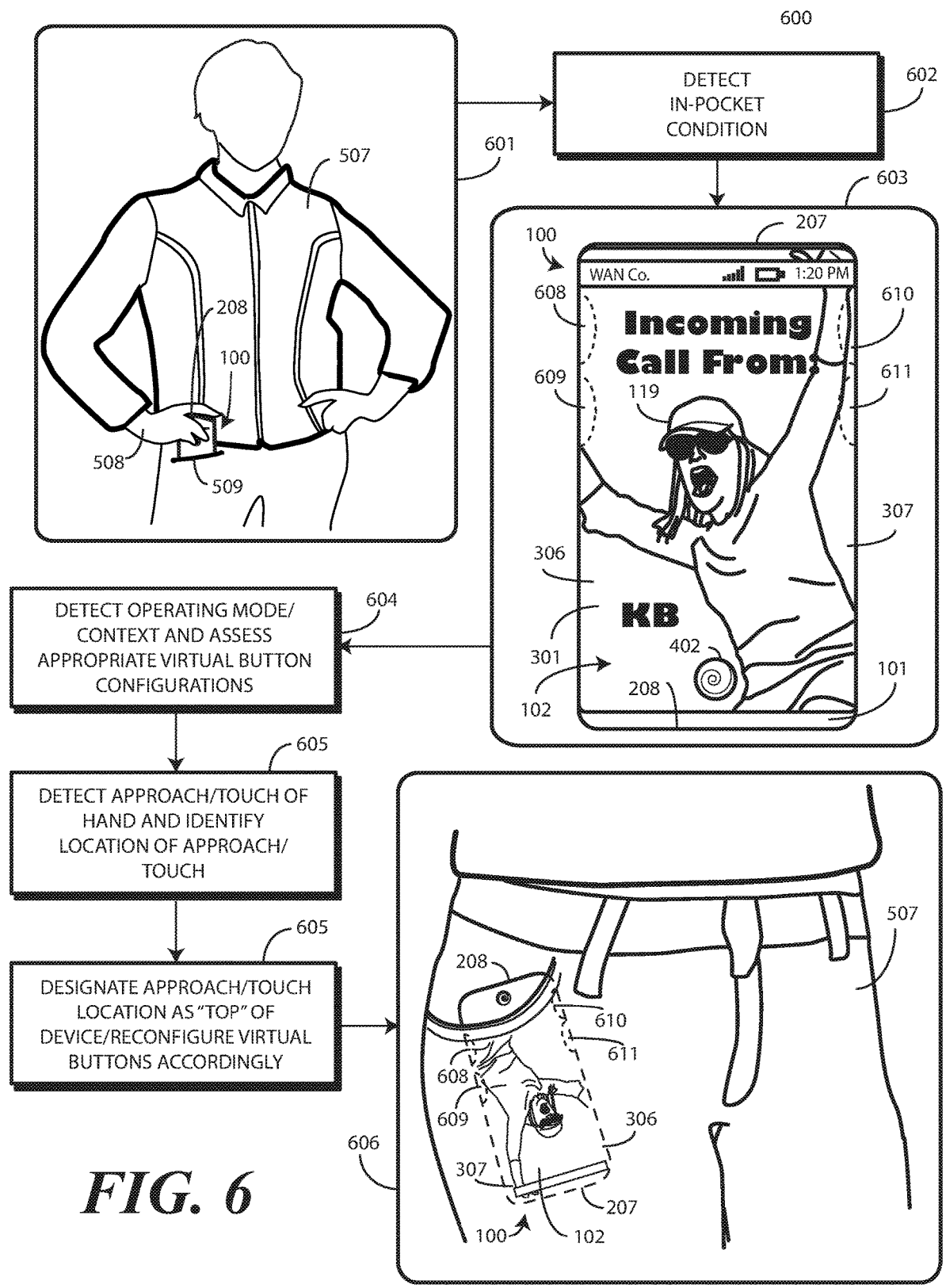
FIG. 6 illustrates one or more explanatory method steps in accordance with one or more embodiments of the disclosure.

Turning now to FIG. 6, illustrated therein is another method 600 configured in accordance with one or more embodiments of the disclosure. The method 600 of FIG. 6, like the method (500) of FIG. 5, allows a user 507 to quickly, easily, and simply actuate a desired user actuation target (while device is inside pocket 509, the user 507 can activate a desired user actuation target by sliding their 508 hand inside the pocket 509 or pressing the user actuation target from outside the pocket 509 through their clothes material) without having to visually look at the electronic device 100 or determine a physical orientation of the electronic device 100. The method 600 of FIG. 6 illustrates one explanatory electronic device 100 executing or more explanatory operating steps in accordance with one or more embodiments of the disclosure.

At step 601 the user 507 is transitioning the electronic device 100 of FIG. 1 to an enclosed condition by placing the electronic device 100 into a pocket 509. In the method 600 of FIG. 6, the electronic device 100 is initially not operating in any particular mode. For example, if the electronic device 100 is a smartphone, the electronic device 100 may be locked with no content being presented on the pre-formed display assembly 102. Where this is the case, there may or may not be any user actuation targets defining virtual buttons presented on the first arched bridging member 306 or the second arched bridging member 307. Once again, without looking, the user 507 inadvertently has the electronic device 100 upside down, i.e., with the bottom surface 208 facing up.

At step 602, one or more sensors of the electronic device 100 detect that the electronic device 100 is now in the enclosed condition. This can be done in a variety of ways, including using either method of FIG. 11. Other techniques for detecting an in-pocket condition will be obvious to those of ordinary skill in the art having the benefit of this disclosure.

At step 603, the electronic device 100 transitions to an active mode of operation. Specifically, the electronic device 100 is configured as a smartphone and is receiving a call from "KB." Accordingly, the electronic device 100 transitions from the inactive mode of operation occurring at step 601 to an active mode of operation at step 603.

While in the active mode of operation, the pre-formed display assembly 102 is presenting content 119. The content 119 in this examples includes a picture of KB and a notification that the call is incoming and is coming from KB. In this illustrative embodiment, the content 119 is in the form of telephone information since the electronic device 100 is operating in a telephone mode. In addition to the content 119, the pre-formed display assembly 102 also presents one or more user actuation targets 402 with which the user 507 may answer the call from KB.

Since the pre-formed display assembly 102 comprises the unitary pre-formed fascia 301 with the first arched bridging member 306 and second arched bridging member 307 serving as display portions spilling with a waterfall effect about sides of the device housing 101, additional content can be presented here as well. In one or more embodiments, the pre-formed display assembly 102 presents one or more user actuation targets 608,609,610,611 defining one or more virtual buttons along minor faces, e.g., the left side and right side, of the device housing 101.

In this illustrative embodiment, the first arched bridging member 306 presents one or more user actuation targets 608,609 defining one or more virtual buttons. Since the electronic device 100 is operating in a telephone mode, user actuation target 608 comprises a "volume up" virtual button, while user actuation target 609 comprises a "volume down" virtual button. The second arched bridging member 307 is also presenting one or more user actuation targets 610,611 defining one or more other virtual buttons. User actuation target 610 defines a "mute" virtual button, while user actuation target 611 defines a "end call" virtual button.

What is important at step 603 is that the virtual buttons presented on the first arched bridging member 306 and the virtual buttons presented on the second arched bridging member 307 are presented in a predefined order relative to a first end, here the top surface 207 of the electronic device 100. To wit, user actuation target 608 is presented above, i.e., closer to the top surface 207 than, user actuation target 609 on the first arched bridging member 306. Similarly, user actuation target 610 is closest to the top surface 207 on the second arched bridging member 307, while user actuation target 611 is the farthest. As before, the electronic device 100 also includes a second end, here bottom surface 208, that is separated from the first end, i.e., top surface 207, by a major face of the device housing 101.

At step 604, the one or more processors (203) of the electronic device 100 detecting the operating mode of the electronic device 100. In one or more embodiments, the one or more processors (203) determine alternate predefined arrangements of the one or more user actuation targets 608,609,610,611 that may be used if the orientation of the electronic device 100 were to change from the default mode of operation occurring at step 603. For example, at step 603 the electronic device 100 is operating in the telephone mode. Accordingly, in one or more embodiments when the one or more user actuation targets 608,609,610,611 defining the one or more virtual buttons are rearranged, they are still configured to control the music player, rather than another application.

Step 604 can include the one or more processors (203) of the electronic device 100 using context and the mode of operation to determine another predefined arrangement of the one or more user actuation targets 608,609,610,611 defining the one or more virtual buttons that will be presented in response to detecting an object approaching a portion of the electronic device 100. Illustrating by example, if the user 507 is listening to music and the device is inside the pocket (FIG. 4), step 604 may comprise the one or more processors (203) of the electronic device 100 selecting an alternate predefined arrangement of the one or more user actuation targets 608,609,610,611 such that the virtual buttons place "volume up" closer to the user's approaching hand due to the fact that the one or more processors (203) presume that the user's first intent is to change volume up based on context. By contrast, if the electronic device 100 is operating in the telephone mode of FIG. 6, and may be loudly ringing, the one or more processors 203 may select an alternate predefined arrangement that moves the "volume down" virtual button closer to the user's approaching hand due to the fact that a likely action the user 507 may take in response to a ringing phone is to silence the ringer. This is one example, but numerous others will be obvious to those of ordinary skill in the art having the benefit of this disclosure.

At step 605, one or more sensors of the electronic device 100 detect an object approaching a portion of the electronic device 100. This object may be the hand 508 of the user 507 in this example Since the electronic device 100 is upside down in the pocket 509, the one or more sensors detect the user's hand approaching the bottom surface 208 of the electronic device 100.

At step 606, the one or more processors (203) of the electronic device 100 therefore designate the bottom surface 208 as the "top" of the electronic device 100. Accordingly, since the bottom surface 208 comprises a distal portion of the device housing 101 that is physically separated from the actual "top" of the electronic device 100 (top surface 207) by the pre-formed display assembly 102, at step 606 the one or more processors (203) cause the first arched bridging member 306 and the second arched bridging member 307 of the pre-formed display assembly 102 to present the one or more user actuation targets 608,609,610,611 in another predefined arrangement, shown at step 607, that is different from the predefined arrangement shown at step 603. In this illustrative embodiment, the new predefined arrangement shown at step 607 is the opposite of the predefined arrangement shown at step 603.

Specifically, as shown at step 607, the one or more processors (203) of the electronic device 100 cause the user actuation targets 608,609,610,611 defining the one or more virtual buttons in the opposite order of that shown at step 603. User actuation target 608 is positioned between user actuation target 609 and the bottom surface 208 at step 607. By contrast, user actuation target 608 was positioned between the top surface 207 and user actuation target 609 at step 603. Similarly, user actuation target 610 is positioned between the bottom surface 208 and user actuation target 611 at step 607 rather than between the top surface 207 and user actuation target 611 at step 603.

This reversal of the predefined arrangement of the one or more user actuation targets 608,609,610,611 defining the one or more virtual buttons allows the user 507 to simply touch a side of the electronic device 100 closest to whichever end is upward to interact, for example, with user actuation target 608 or user actuation target 610. Since the locations of these user actuation targets 608,610 is known, the user 507 can simply slide their finger further down the first arched bridging member 306 or second arched bridging member 307 to interact with the other user actuation targets 609,611.

Figure 7:
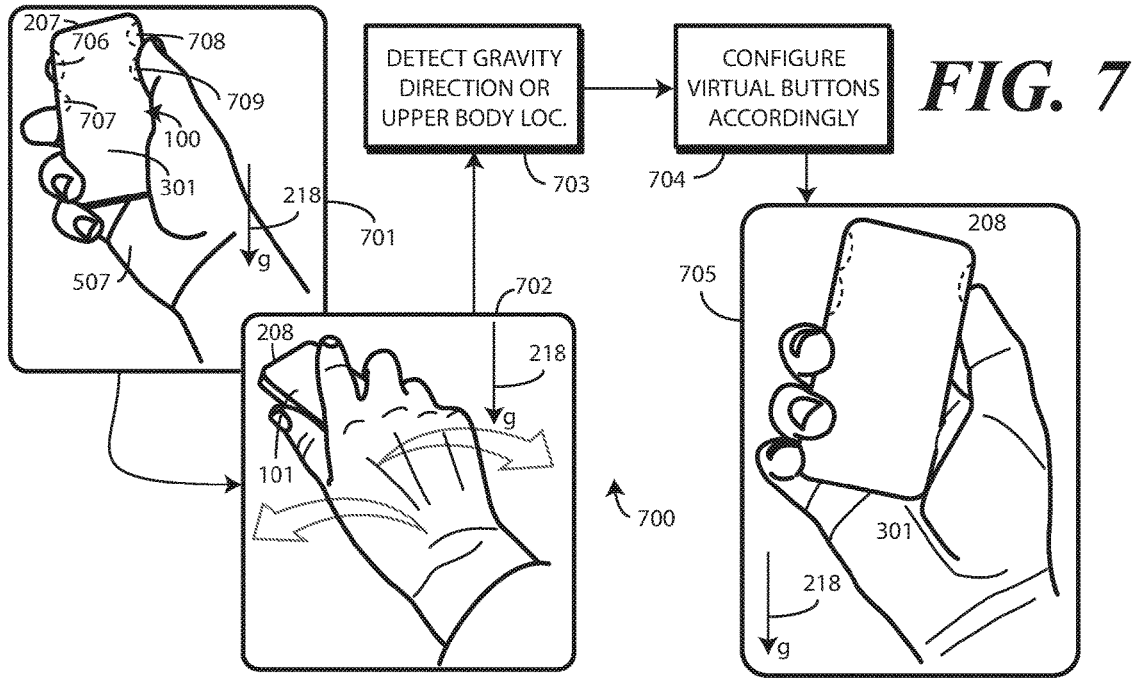
FIG. 7 illustrates one or more explanatory method steps in accordance with one or more embodiments of the disclosure.

Turning now to FIG. 7, illustrated therein is another method 700 configured in accordance with one or more embodiments of the disclosure. In the method 700 of FIG. 7, the one or more processors (203) use signals from the orientation detector (216) to detect the direction of gravity 218 to rearrange one or more user actuation target defining one or more virtual buttons on the electronic device 100. For example, an accelerometer can be used to determine the orientation of the electronic device 100 relative to the direction of gravity 218, with the one or more processors (203) using that information to cause the unitary pre-formed fascia 301 to present the one or more user actuation targets defining the one or more virtual buttons in another predefined arrangement that is different from the predefined arrangement before the orientation of the electronic device 100 changed relative to the direction of gravity 218. Advantageously, the method 700 of FIG. 7 always interprets the higher surface of the electronic device 100 relative to the direction of gravity 218 as the "top" of the electronic device 100.

Beginning at step 701, the user 507 is holding the electronic device 100 in a first orientation relative to the direction of gravity 218. The one or more processors (203) cause the first arched bridging member 306 and the second arched bridging member 307 to present one or more user actuation targets 706,707,708,709 in a first predefined arrangement. In the first predefined arrangement of step 701, user actuation target 706 is positioned between the top surface 207 of the electronic device 100 and user actuation target 707. Similarly, user actuation target 708 is positioned between the top surface 207 of the electronic device 100 and user actuation target 709. Step 701 thus shows the one or more processors (203) causing the unitary pre-formed fascia 301 to present one or more user actuation targets 706,707,708,709 defining one or more virtual buttons in a predefined arrangement relative to a first end of the electronic device 100, which is the top surface 207 in this example.

At step 702, the user 507 flips the electronic device 100, thereby causing the lower surface 208 to now be the higher side of the electronic device 100 relative to the direction of gravity 218. At step 703, one or more sensors of the electronic device 100 detect this reversal of the direction of gravity 218 relative to the device housing 101 of the electronic device. At step 704, the one or more processors (203), in response to the one or more sensors detecting the reversal of the direction of gravity 218 relative to the device housing 101, cause the unitary pre-formed fascia 301 to present the one or more user actuation targets 706,707,708, 709 defining the one or more virtual buttons in another predefined arrangement that is different from the predefined arrangement of step 701.

As shown at step 705, the one or more processors (203) of the electronic device 100 cause the unitary pre-formed fascia 301 to present the one or more user actuation targets 706,707,708,709 defining the one or more virtual buttons in an opposite arrangement from that shown at step 701. Here, in the new predefined arrangement of step 705, user actuation target 706 is positioned between the lower surface 208 of the electronic device 100 and user actuation target 707. Similarly, user actuation target 708 is positioned between the lower surface 208 of the electronic device 100 and user actuation target 709. Step 705 thus shows the one or more processors (203) causing the unitary pre-formed fascia 301 to present one or more user actuation targets 706,707,708, 709 defining one or more virtual buttons in another predefined arrangement relative to a second end of the electronic device 100, which is the bottom surface 208 in this example.

In one or more embodiments, step 704 only occurs when the one or more sensors detect the reversal of the direction of gravity 218 relative to a major face of the device housing 101. Said differently, in one or more embodiments step 704 occurs only when the reversal of the direction of gravity 218 occurs along an axis parallel to a major surface of the electronic device 100, as shown in FIG. 7. Accordingly, in one or more embodiments the one or more processors (203) cause the unitary pre-formed fascia 301 to present the one or more user actuation targets 706,707,708,709 defining the one or more virtual buttons in the other predefined arrangement only when the one or more sensors detect the reversal of the direction of gravity 218 relative to a major face of the device housing 101.

Figure 8:
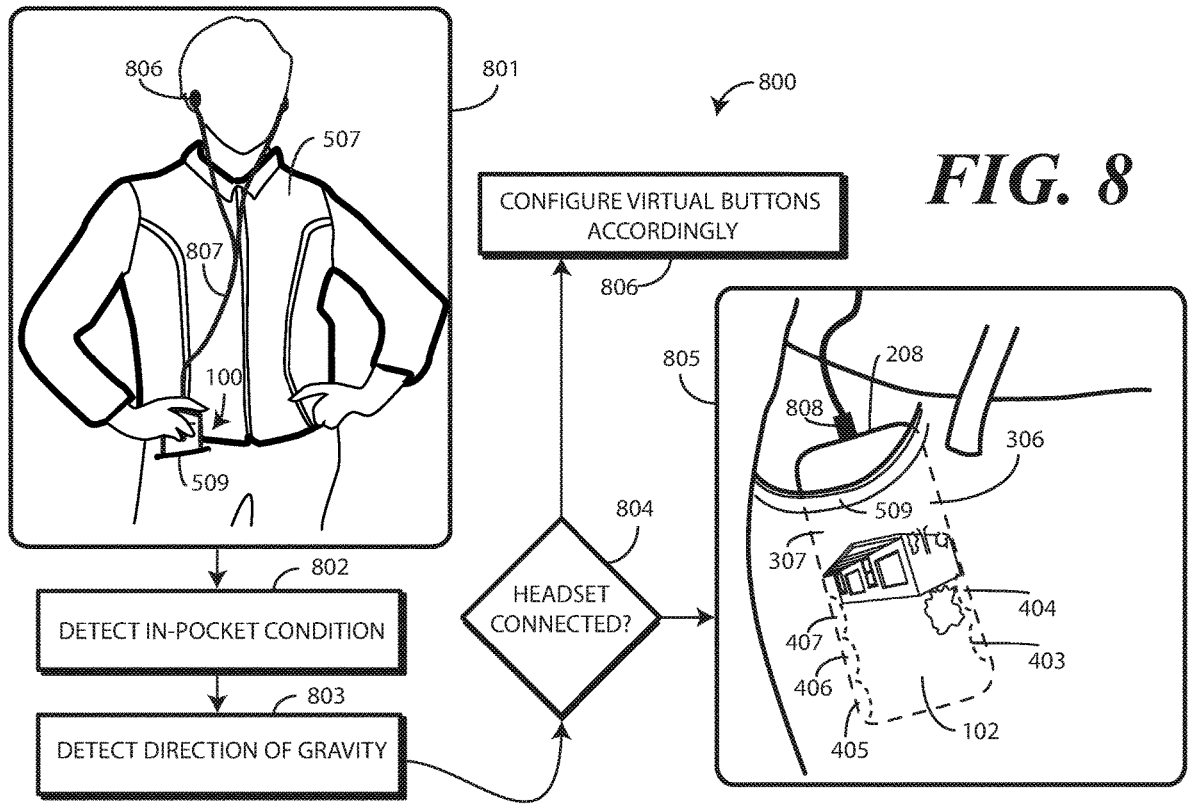
FIG. 8 illustrates one or more explanatory method steps in accordance with one or more embodiments of the disclosure.

Turning now to FIG. 8, illustrated therein is an optional method 800 that precludes any rearrangement of user actuation targets defining virtual buttons in accordance with one or more embodiments of the disclosure. As shown at step 801, a user 507 is again transitioning the electronic device 100 of FIG. 4, while operating in the music player mode described in FIG. 4, to an enclosed condition by placing the electronic device 100 into a pocket 509. The user 507 is listening to Buster and his Bluesmen using a wired headset 806 connected to the electronic device 100 with a wire 807.

As before, the user 507 has the electronic device 100 upside down due to the fact that the headset 806 is connected to the electronic device 100. Since the electronic device 100 is operating in the music player mode, the pre-formed display assembly 102 presents the one or more user actuation targets 403,404,405,406,407 defining the one or more virtual buttons in the predefined arrangement described above with reference to FIG. 4, with user actuation target 403 closer to the top surface 207 than user actuation target 404, with user actuation target 405 closer to the top surface 207 than user actuation target 406, and so forth.

At step 802, one or more sensors of the electronic device 100 detect that the electronic device 100 is now in the enclosed condition. This can be done in a variety of ways, including using either method of FIG. 11. Other techniques for detecting an in-pocket condition will be obvious to those of ordinary skill in the art having the benefit of this disclosure.

At step 803, one or more sensors of the electronic device 100 detect a changing condition. In the illustrative example of FIG. 8, this changing condition is a reversal of the direction of gravity (218) similar to that detected above at step (703) of the method (700) of FIG. 7. However, the change detected at step 803 could be an approaching hand (FIG. 5), tapping or movement (FIG. 10) or another change causing the one or more processors (203) of the electronic device 100 to rearrange the one or more user actuation targets 403,404,405,406,407 defining the one or more virtual buttons.

Decision 804 then determines whether a headset 806 is connected to the electronic device 100. Where no headset 806 is connected to the electronic device 100, step 805 results in the one or more processors (203) of the electronic device 100 causing the unitary pre-formed fascia 301 to present the one or more user actuation targets 403,404,405, 406,407 defining the one or more virtual buttons in another predefined arrangement that is different from the original predefined arrangement as previously described.

In this illustrative embodiment, however, the headset 806 is coupled to the electronic device 100. Accordingly, at step 805 the one or more processors (203) preclude the unitary pre-formed fascia 301 from presenting the one or more user actuation targets 403,404,405,406,407 defining the one or more virtual buttons in the other predefined arrangement when the one or more sensors detect the reversal of the direction of gravity (218) relative to the device housing (101) while a wired headset is coupled to the electronic device 100. The reason for this is that the user 507 is able to sense the headset jack 808, thereby instantly determining that the lower surface 208 is exposed from the pocket 509. Since the user 507 can deduce the orientation of the electronic device 100 from the headset jack 808, they understand where along the first arched bridging member 306 or second arched bridging member 307 to press to actuate a particular user actuation target 403,404,405,406,407.

Figure 9:
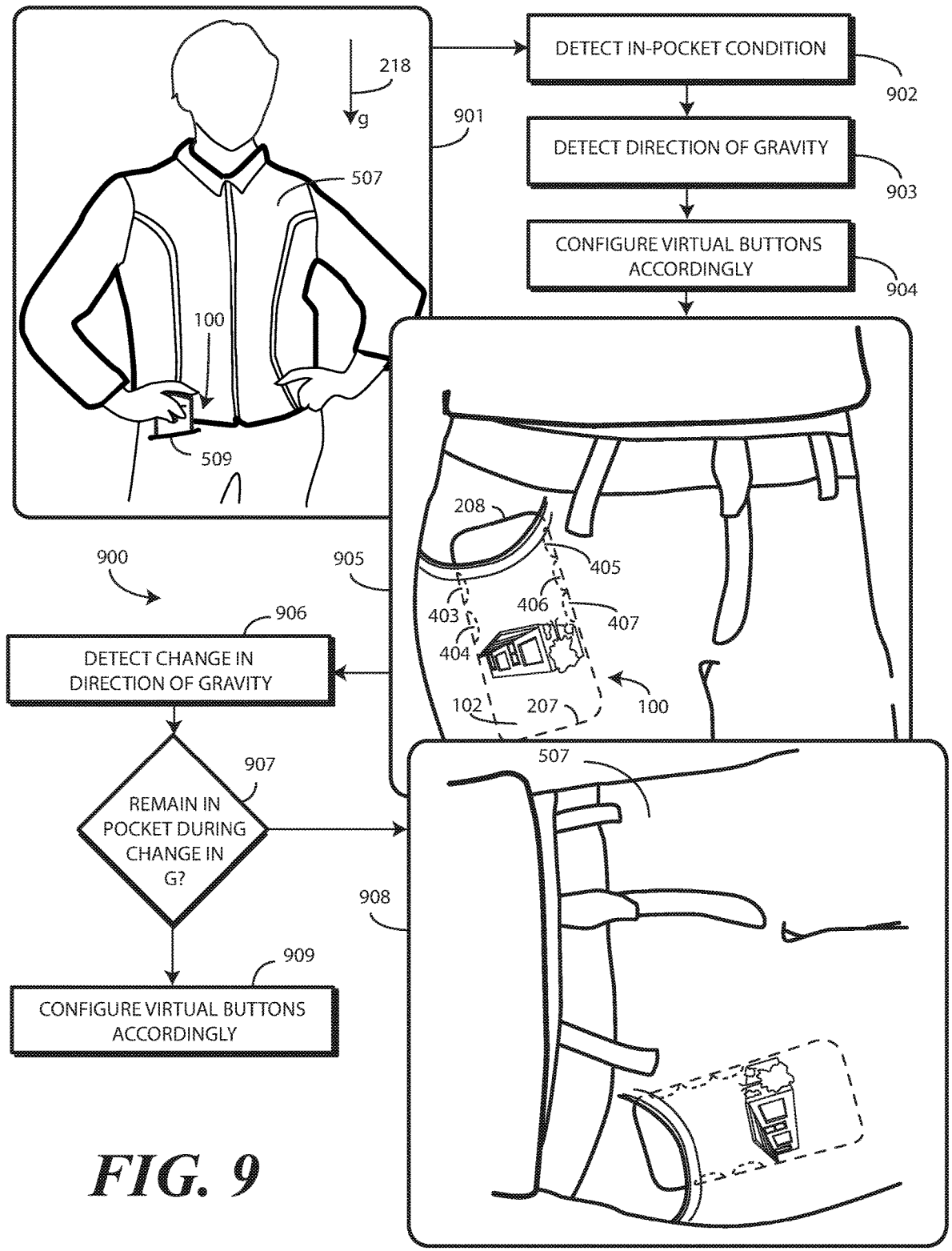
FIG. 9 illustrates one or more explanatory method steps in accordance with one or more embodiments of the disclosure.

Turning now to FIG. 9, illustrated therein is another method 900 in accordance with one or more embodiments of the disclosure. Embodiments of the disclosure contemplate that the method (700) of FIG. 7, which detects a change in the direction of gravity 218 works well as a trigger causing the one or more processors (203) of the electronic device 100 to cause the unitary pre-formed fascia 301 to rearrange any user actuation targets defining one or more virtual buttons. This is especially true with the user's body posture is vertical, e.g., when the user 507 is standing, sitting upright, or walking. However, if the user 507 horizontal, e.g., when lying on a bed, the direction of gravity 218 detection may not be the most efficient trigger. The method 900 of FIG. 9 provides one alternative that is suitable for use in such situations.

As shown at step 901, a user 507 is again transitioning the electronic device 100 of FIG. 4, while operating in the music player mode described in FIG. 4, to an enclosed condition by placing the electronic device 100 into a pocket 509. As before, the user 507 has the electronic device 100 upside down. Since the electronic device 100 is operating in the music player mode, the pre-formed display assembly 102 presents the one or more user actuation targets 403,404,405, 406,407 defining the one or more virtual buttons in the predefined arrangement described above with reference to FIG. 4, with user actuation target 403 closer to the top surface 207 than user actuation target 404, with user actuation target 405 closer to the top surface 207 than user actuation target 406, and so forth.

At step 902, one or more sensors of the electronic device 100 detect that the electronic device 100 is now in the enclosed condition. This can be done in a variety of ways, including using either method of FIG. 11. Other techniques for detecting an in-pocket condition will be obvious to those of ordinary skill in the art having the benefit of this disclosure.

At step 903, one or more sensors of the electronic device 100 detect the direction of gravity 218 relative to the device housing (101) of the electronic device 100. If the direction of gravity 218 runs from the top surface 207 to the lower surface 208, the one or more processors (203) of the electronic device 100 cause the unitary pre-formed fascia 301 to present the one or more user actuation targets 403,404,405,406,407 in the predefined arrangement shown in FIG. 4 at step 904. Where the direction of gravity 218 runs from the lower surface 208 to the upper surface 207, as shown at step 905, the one or more processors (203) of the electronic device 100 cause the unitary pre-formed fascia 301 to present the one or more user actuation targets 403,404,405,406,407 in another predefined arrangement at step 904.

At step 906, the one or more sensors of the electronic device 100 detect a change in the direction of gravity 218. Decision 907 then determines whether the change in the direction of gravity 218 occurred while the electronic device 100 was in the enclosed condition, which in this example is that of being in the pocket 509.

In one or more embodiments, the method 900 of FIG. 9 monitors the orientation of the electronic device 100 relative to the direction of gravity 218 while the enclosed condition is occurring. Embodiments of the disclosure contemplate that this can occur, for example, when the user 507 lays down, as shown at step 908. In one or more embodiments, when this happens, the one or more processors (203) of the electronic device 100 preclude the unitary pre-formed fascia 301 from presenting the one or more user actuation target 403,404,405,406,407 defining the one or more virtual buttons in the other predefined arrangement when the one or more sensors detect the change or reversal of the direction of gravity 218 relative to the device housing (101) while the electronic device 100 is in the enclosed condition. Thus, at step 908 the one or more user actuation targets 403,404, 405,406,407 are presented in the exact same predefined arrangement as that of step 905. By contrast, when the change in the direction of gravity occurs when the electronic device 100 is not enclosed, the one or more processors (203) can cause the unitary pre-formed fascia 301 to present the one or more user actuation targets 403,404,405,406,407 in the other configuration at step 909, as previously described. Electronic device contextual detection can also be tracked for orientation assessment when user 507 lays down (the last orientation during the last pocket detection) in one or more embodiments.

Figure 10:
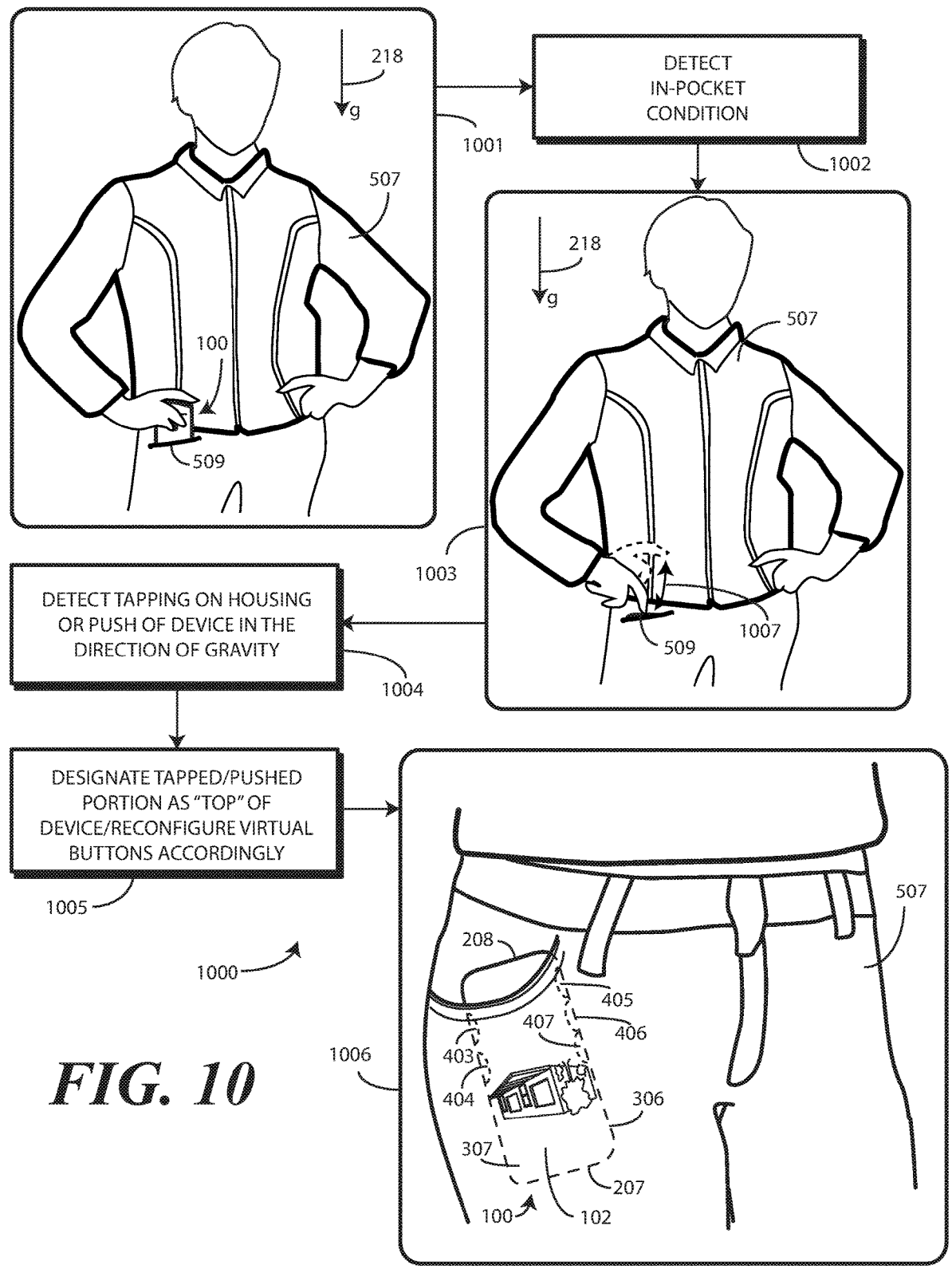
FIG. 10 illustrates one or more explanatory method steps in accordance with one or more embodiments of the disclosure.

Turning now to FIG. 10, illustrated therein is still another method 1000 configured in accordance with one or more embodiments of the disclosure. The method 1000 of FIG. 10 expands the method (500) described above with reference to FIG. 5 to include tapping the device housing 101 or pushing, i.e., applying a loading force causing translation of, the electronic device 100 along the direction of gravity 218. The advantage of the method 1000 of FIG. 10 is in mapping each half of the electronic device 100 as a function of the direction of gravity 218 based upon which is closer to the user's body. The method 1000 can optionally expand to situations when user actuation targets defining virtual buttons are presented in the middle back of the electronic device 100, or other places where up/down is hard to discern.

As shown at step 1001, a user 507 is again transitioning the electronic device 100 of FIG. 4, while operating in the music player mode described in FIG. 4, to an enclosed condition by placing the electronic device 100 into a pocket 509. As before, the user 507 has the electronic device 100 upside down. Since the electronic device 100 is operating in the music player mode, the pre-formed display assembly 102 presents the one or more user actuation targets 403,404, 405,406,407 defining the one or more virtual buttons in the predefined arrangement described above with reference to FIG. 4, with user actuation target 403 closer to the top surface 207 than user actuation target 404, with user actuation target 405 closer to the top surface 207 than user actuation target 406, and so forth.

At step 1002, one or more sensors of the electronic device 100 detect that the electronic device 100 is now in the enclosed condition. This can be done in a variety of ways, including using either method of FIG. 11. Other techniques for detecting an in-pocket condition will be obvious to those of ordinary skill in the art having the benefit of this disclosure.

At step 1003, the user 507 is tapping 1007 a portion of the electronic device 100, here the lower surface 208, along the direction of gravity 218 while the electronic device 100 is in the enclosed condition of being situated within the pocket 509. While tapping 1007 is used in this illustrative example as a condition that can occur, in other embodiments the condition will be pushing the portion of the electronic device 100 along the direction of gravity 218 when the electronic device 100 is in the enclosed condition.

At step 1004, one or more sensors of the electronic device 100 detect the object, here the user's finger, tapping 1007 or pushing the portion of the device housing 101 along the direction of gravity 218 while the electronic device 100 is in the enclosed condition. At step 1004, the one or more processors (203) designate the tapped or pushed portion as the "top" of the electronic device 100. Accordingly, at step 1005 the one or more processors (203) cause, in response to identifying the tapped or pushed portion, which in this example is a distal portion of the device housing (101) from the first end (top surface 207) of the device housing 101 defining the predefined arrangement of the one or more user actuation targets 403,404,405,406,407 defining the one or more virtual buttons, the unitary pre-formed fascia 301 to present the one or more user actuation targets 403,404,405, 406,407 in another predefined arrangement that is different from the original, as shown at step 1006 and as previously described.

Specifically, as shown at step 1006, the one or more processors (203) of the electronic device cause the user actuation targets 403,404,405,406,407 defining the one or more virtual buttons in the opposite order of that shown in FIG. 4. User actuation target 403 is positioned between user actuation target 404 and the bottom surface 208 at step 1006. By contrast, user actuation target 403 was positioned between the top surface 207 and user actuation target 404 in FIG. 4. Similarly, user actuation target 405 is positioned between the bottom surface 208 and user actuation target 406 at step 1006 rather than between the top surface 207 and user actuation target 406 in FIG. 4.

This reversal of the predefined arrangement of the one or more user actuation targets 403,404,405,406,407 defining the one or more virtual buttons allows the user 507 to simply touch a side of the electronic device 100 closest to whichever end is upward to interact, for example, with user actuation target 403 or user actuation target 405. Since the locations of these user actuation targets 403,405 is known, the user 507 can simply slide their finger further down the first arched bridging member 306 or second arched bridging member 307 to interact with the other user actuation targets 404,406,407.

As noted above, the headset exception could apply in the method 1000 of FIG. 10. Said differently, in one or more embodiments the one or more processors (203) preclude the unitary pre-formed fascia 301 from presenting the one or more user actuation targets 403,404,405,406,407 defining the one or more virtual buttons in the other predefined arrangement when the one or more sensors detect the object tapping 1007 or pushing the portion of the device housing (101) while a wired headset (806) is coupled to the electronic device 100.

Figure 12:
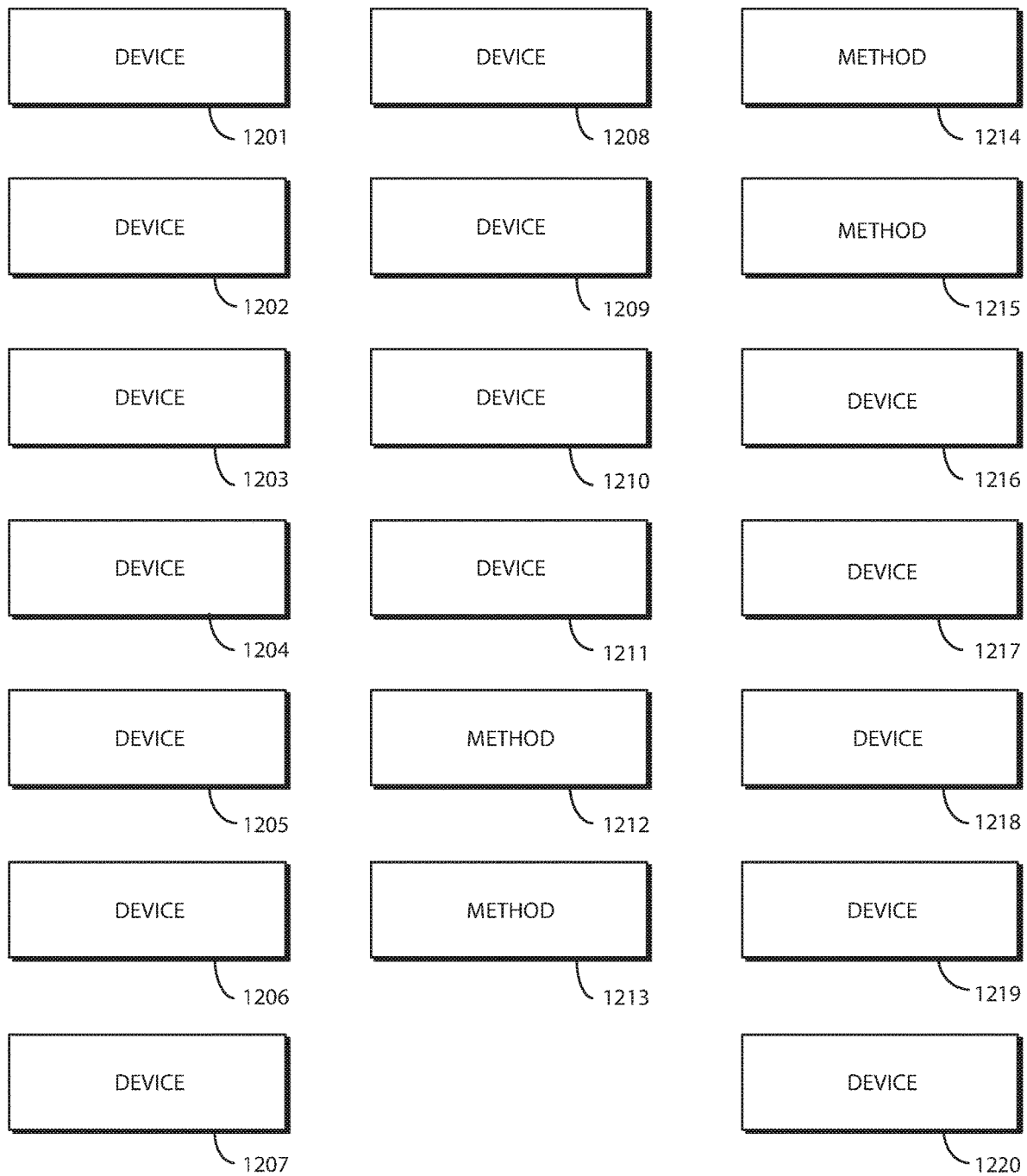
FIG. 12 illustrates one or more embodiments of the disclosure.

Turning now to FIG. 12, illustrated therein are various embodiments of the disclosure. The embodiments of FIG. 12 are shown as labeled boxes in FIG. 12 due to the fact that the individual components of these embodiments have been illustrated in detail in FIGS. 1-11, which precede FIG. 12. Accordingly, since these items have previously been illustrated and described, their repeated illustration is no longer essential for a proper understanding of these embodiments. Thus, the embodiments are shown as labeled boxes.

At 1201, an electronic device comprises a device housing. At 1201, the electronic device comprises one or more displays presenting one or more user actuation targets defining one or more virtual buttons in a predefined arrangement relative to a first end of the device housing.

At 1201, one or more sensors detect an object approaching a portion of the device housing when the electronic device is in an enclosed condition. At 1201, one or more processors, operable with the one or more sensors, cause, when the portion of the device housing is a distal portion of the device housing from the first end of the device housing, the one or more displays to present the one or more user actuation targets defining the one or more virtual buttons in another predefined arrangement that is different from the predefined arrangement.

At 1202, the one or more processors of 1201 further detect an operating mode of the electronic device. At 1202, the other predefined arrangement of 1201 is a function of the operating mode.

At 1203, the other predefined arrangement of 1201 arranges the one or more user actuation targets opposite that of the predefined arrangement of 1201. At 1204, the one or more displays of 1203 present the one or more user actuation targets defining the one or more virtual buttons along one or more minor faces of the device housing.

At 1205, the one or more displays of 1204 comprise a single display. At 1206, the single display of 1205 comprises a unitary glass fascia defining at least one major surface spanning a major face of the device housing and one or more curved contours spanning the one or more minor faces of the device housing. At 1207, the single display of 1206 presents the one or more user actuation targets defining the one or more virtual buttons along the one or more curved contours.

At 1208, the portion of the device housing of 1204 comprises a second end of the device housing separated from the first end of the device housing by a major face of the device housing. At 1209, the one or more displays of 1208 present the one or more user actuation targets defining the one or more virtual buttons along minor faces of the electronic device situated between the first end of the device housing and the second end of the device housing.

At 1210, the enclosed condition of 1209 comprises an in-pocket condition. At 1211, the one or more processors of 1210 preclude the one or more displays from presenting the one or more user actuation targets defining the one or more virtual buttons in the another predefined arrangement when the one or more sensors detect the object approaching the portion of the device housing when a wired headset is coupled to the electronic device.

At 1212, an electronic device comprises a device housing. At 1212, the electronic device comprises one or more displays presenting one or more user actuation targets defining one or more virtual buttons in a predefined arrangement relative to a first end of the device housing.

At 1212, the electronic device comprises one or more sensors detecting a reversal of a direction of gravity relative to the device housing. At 1212, the electronic device comprises one or more processors, operable with the one or more sensors. At 121, the one or more processors cause, in response to the one or more sensors detecting the reversal of the direction of gravity relative to the device housing, causing the one or more displays to present the one or more user actuation targets defining the one or more virtual buttons in another predefined arrangement that is different from the predefined arrangement.

At 1213, the one or more processors of 1212 preclude the one or more displays from presenting the one or more user actuation targets defining the one or more virtual buttons in the another predefined arrangement when the one or more sensors detecting the reversal of the direction of gravity relative to the device housing while the electronic device is in an enclosed condition. At 1214, the one or more processors of 1212 preclude the one or more displays from presenting the one or more user actuation targets defining the one or more virtual buttons in the another predefined arrangement when the one or more sensors detect the reversal of the direction of gravity relative to the device housing while a wired headset is coupled to the electronic device.

At 1215, the one or more processors of 1212 cause the one or more displays to present the one or more user actuation targets defining the one or more virtual buttons in the another predefined arrangement only when the one or more sensors detect the reversal of the direction of gravity relative to a major face of the device housing. At 1216, the one or more processors of 1212 further detect an operating mode of the electronic device, wherein the other predefined arrangement is a function of the operating mode.

At 1217, an electronic device comprises a device housing. At 1217, the electronic device comprises one or more displays presenting one or more user actuation targets defining one or more virtual buttons in a predefined arrangement relative to a first end of the device housing.

At 1217, the electronic device comprises one or more sensors detecting an object tapping or pushing a portion of the device housing along a direction of gravity when the electronic device is in an enclosed condition. At 1217, the electronic device comprises one or more processors, operable with the one or more sensors. At 1217, the one or more processors cause, when the portion of the device housing is a distal portion of the device housing from the first end of the device housing, the one or more displays to present the one or more user actuation targets defining the one or more virtual buttons in another predefined arrangement that is different from the predefined arrangement.

At 1218, the one or more processors of 1217 preclude the one or more displays from presenting the one or more user actuation targets defining the one or more virtual buttons in the other predefined arrangement when the one or more sensors detect the object tapping or pushing the portion while a wired headset is coupled to the electronic device. At 1219, the one or more displays of 1217 comprise a unitary glass fascia defining at least one major surface spanning a major face of the device housing and at least one curved contour spanning a minor face of the device housing, wherein the one or more user actuation targets defining the one or more virtual buttons are presented along the at least one curved contour. At 1220, the first end of 1219 and the portion of the electronic device separated by the at least one curved contour.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example in one or more embodiments an in-pocket context triggers an orientation detector, which in turns triggers the predefined arrangement of one or more user actuation targets defining one or more virtual buttons along curved contours of a unitary pre-formed fascia. In one or more embodiments, when the electronic device is in a pocket and the electronic device orientation is right side up, the one or more user actuation targets defining the one or more virtual buttons are presented in a first predefined arrangement. By contrast, if the electronic device is in a pocket and the electronic device is oriented upside down, the one or more user actuation targets defining the one or more virtual buttons are presented in another predefined arrangement that is different from the first predefined arrangement.

In one or more embodiments, sliding a hand and touching the electronic device defines a touched portion of the electronic device as the "top," thereby configuring the predefined arrangement used for the one or more user actuation targets defining the one or more virtual buttons. Operating mode and other contextual cues can also drive predefined arrangement used for the one or more user actuation targets defining the one or more virtual buttons.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a device housing;
   one or more displays presenting one or more user actuation targets in an arrangement relative to a first end of the device housing;
   one or more sensors detecting an object approaching a portion of the device housing; and one or more processors, operable with the one or more sensors, the one or more processors causing, when the portion of the device housing is a distal portion of the device housing from the first end of the device housing, the one or more displays to present the one or more user actuation targets in a different arrangement.

2. The electronic device of claim 1, the one or more processors further detecting an operating mode of the electronic device, wherein the different arrangement is a function of the operating mode.

3. The electronic device of claim 1, wherein the different arrangement is opposite that of the arrangement.

4. The electronic device of claim 3, the one or more displays presenting the one or more user actuation targets along one or more minor faces of the device housing.

5. The electronic device of claim 4, the one or more displays comprising a single display.

6. The electronic device of claim 5, the single display comprising a unitary glass fascia defining at least one major surface spanning a major face of the device housing and one or more curved contours spanning the one or more minor faces of the device housing.

7. The electronic device of claim 6, the single display presenting the one or more user actuation targets along the one or more curved contours.

8. The electronic device of claim 4, the portion of the device housing comprising a second end of the device housing separated from the first end of the device housing by a major face of the device housing.

9. The electronic device of claim 8, the one or more displays presenting the one or more user actuation targets along minor faces of the electronic device situated between the first end of the device housing and the second end of the device housing.

10. The electronic device of claim 9, the one or more sensors detecting the object approaching the portion of the device housing when the electronic device is in a pocket-enclosed condition.

11. The electronic device of claim 10, the one or more processors precluding the one or more displays from presenting the one or more user actuation targets in the different arrangement when the one or more sensors detect the object approaching the portion of the device housing while a wired headset is coupled to the electronic device.

12. An electronic device, comprising:
a device housing;
one or more displays presenting one or more user actuation targets in an arrangement relative to a first end of the device housing;
one or more sensors detecting a rotation of the electronic device relative to a direction of gravity; and
one or more processors, operable with the one or more sensors, the one or more processors causing, in response to the one or more sensors detecting the rotation of the electronic device relative to the direction of gravity, the one or more displays to present the one or more user actuation targets in a different arrangement.

13. The electronic device of claim 12, the one or more processors precluding the one or more displays from presenting the one or more user actuation targets in the different arrangement when the one or more sensors detecting the rotation while the electronic device is in an enclosed condition.

14. The electronic device of claim 12, the one or more processors precluding the one or more displays from presenting the one or more user actuation targets in the different arrangement when the one or more sensors detect the rotation while a wired headset is coupled to the electronic device.

15. The electronic device of claim 12, the one or more processors causing the one or more displays to present the one or more user actuation targets in the different arrangement only when the one or more sensors detect the rotation occurring relative to a major face of the device housing.

16. The electronic device of claim 12, the one or more processors further detecting an operating mode of the electronic device, wherein the different arrangement is a function of the operating mode.

17. An electronic device, comprising:
a device housing;
one or more displays presenting one or more user actuation targets defining one or more virtual buttons in an arrangement relative to a first end of the electronic device;
one or more sensors detecting an object moving a portion of the device housing along a direction of gravity; and
one or more processors, operable with the one or more sensors, the one or more processors causing, when the portion of the device housing is a distal portion of the device housing from the first end of the device housing, the one or more displays to present the one or more user actuation targets in a different arrangement.

18. The electronic device of claim 17, the one or more processors precluding the one or more displays from presenting the one or more user actuation targets in the different arrangement when the one or more sensors detect the object moving the portion while a wired headset is coupled to the electronic device.

19. The electronic device of claim 17, the one or more displays comprising a unitary glass fascia defining at least one major surface spanning a major face of the device housing and at least one curved contour spanning a minor face of the device housing.

20. The electronic device of claim 19, the first end of the electronic device and the portion of the electronic device separated by the at least one curved contour.

* * * * *